(12) United States Patent
Schoeder et al.

(10) Patent No.: US 10,976,329 B2
(45) Date of Patent: Apr. 13, 2021

(54) METHOD AND SYSTEM FOR TESTING A SAMPLE

(71) Applicant: Boehringer Ingelheim Vetmedica GmbH, Ingelheim am Rhein (DE)

(72) Inventors: Heinz Schoeder, Isernhagen (DE); Kai Wuerz, Mainz (DE)

(73) Assignee: BOEHRINGER INGELHEIM VETMEDICA GMBH, Ingelheim am Rhein (DE)

( * ) Notice: Subject to any disclaimer, the term of this patent is extended or adjusted under 35 U.S.C. 154(b) by 309 days.

(21) Appl. No.: 15/725,362

(22) Filed: Oct. 5, 2017

(65) Prior Publication Data

US 2018/0100870 A1   Apr. 12, 2018

(30) Foreign Application Priority Data

Oct. 7, 2016   (EP) .................................... 16020387

(51) Int. Cl.
*G01N 35/00* (2006.01)
*B01L 3/00* (2006.01)
*B01L 7/00* (2006.01)

(52) U.S. Cl.
CPC .. *G01N 35/00871* (2013.01); *B01L 3/502715* (2013.01); *B01L 3/545* (2013.01); *G01N 35/00029* (2013.01); *G01N 35/00732* (2013.01); *B01L 3/502* (2013.01); *B01L 7/52* (2013.01); *B01L 2200/028* (2013.01); *B01L 2200/0621* (2013.01); *B01L 2200/143* (2013.01); *B01L 2300/021* (2013.01); *B01L 2300/022* (2013.01); *B01L 2300/023* (2013.01); *B01L 2300/0816* (2013.01); *B01L 2400/0457* (2013.01); *B01L 2400/0487* (2013.01); *G01N 2035/00811* (2013.01); *G01N 2035/00851* (2013.01); *G01N 2035/00881* (2013.01)

(58) Field of Classification Search
None
See application file for complete search history.

(56) References Cited

U.S. PATENT DOCUMENTS

| | | | |
|---|---|---|---|
| 5,096,669 | A | 3/1992 | Lauks et al. |
| 5,961,451 | A | 10/1999 | Reber et al. |
| 6,709,869 | B2 | 3/2004 | Mian et al. |
| 7,077,328 | B2 | 7/2006 | Krishnaswamy et al. |
| 7,838,261 | B2 | 11/2010 | Gumbrecht et al. |
| 8,580,569 | B2 | 11/2013 | Linder et al. |
| 8,950,424 | B2 | 2/2015 | Weber et al. |
| 9,110,044 | B2 | 8/2015 | Gumbrecht et al. |
| 9,186,278 | B2 | 11/2015 | Baym et al. |
| 9,686,395 | B2 | 6/2017 | Erickson et al. |

(Continued)

FOREIGN PATENT DOCUMENTS

| | | |
|---|---|---|
| AU | 2013201509 B2 | 11/2015 |
| DE | 20 2010 007 208 U1 | 1/2012 |

*Primary Examiner* — Kathryn Wright
(74) *Attorney, Agent, or Firm* — David S. Safran; Roberts Calderon Safran & Cole, P.C.

(57) ABSTRACT

An analysis system and a method for testing a biological sample are proposed, wherein certain pieces of at least two different pieces of control information are selected and/or used to carry out the test using a cartridge and/or certain pieces of at least two different pieces of evaluation information are selected and/or used to evaluate the measurement results determined by the test.

13 Claims, 4 Drawing Sheets

(56) References Cited

U.S. PATENT DOCUMENTS

| | | |
|---|---|---|
| 9,810,704 B2 | 11/2017 | Holmes et al. |
| 2005/0047973 A1 | 3/2005 | Schulz et al. |
| 2006/0292039 A1 | 12/2006 | Iida |
| 2008/0207461 A1 | 8/2008 | Ermantraut et al. |
| 2008/0240983 A1 | 10/2008 | Harris |
| 2009/0145753 A1 | 6/2009 | Yang et al. |
| 2012/0123686 A1 | 5/2012 | Xiang et al. |
| 2014/0052400 A1* | 2/2014 | Ogura ............... B01L 3/545 |
| | | 702/85 |
| 2014/0335505 A1 | 11/2014 | Holmes |
| 2018/0141038 A1* | 5/2018 | Van Der Zaag ........ B01L 3/502 |

\* cited by examiner

METHOD AND SYSTEM FOR TESTING A SAMPLE

BACKGROUND OF THE INVENTION

Field of the Invention

The present invention relates to a method and system for testing a sample.

Preferably, the present invention deals with analyzing and testing a sample, in particular from a human or animal, particularly preferably for analytics and diagnostics, for example with regard to the presence of diseases and/or pathogens and/or for determining blood counts, antibodies, hormones, steroids or the like. Therefore, the present invention is in particular within the field of bioanalytics. A food sample, environmental sample or another sample may optionally also be tested, in particular for environmental analytics or food safety and/or for detecting other substances.

Preferably, by means of the present invention, at least one analyte (target analyte) of a sample can be determined, identified or detected. In particular, the sample can be tested for qualitatively or quantitatively determining at least one analyte, for example, in order for it to be possible to detect or identify a disease and/or pathogen.

Within the meaning of the present invention, analytes are in particular nucleic-acid sequences, in particular DNA sequences and/or RNA sequences, and/or proteins, in particular antigens and/or antibodies. In particular, by means of the present invention, nucleic-acid sequences can be determined, identified or detected as analytes of a sample, and/or proteins can be determined, identified or detected as analytes of the sample. More particularly preferably, the present invention deals with systems, devices and other apparatus for carrying out a nucleic-acid assay for detecting or identifying a nucleic-acid sequence and/or a protein assay for detecting or identifying a protein.

The present invention deals in particular with what are known as point-of-care systems, i.e., in particular with mobile systems, devices and other apparatus, and deals with methods for carrying out tests on a sample at the sampling site and/or independently and/or away from a central laboratory or the like. Preferably, point-of-care systems can be operated autonomously and/or independently of a mains network for supplying electrical power.

Description of Related Art

U.S. Pat. No. 5,096,669 discloses a point-of-care system for testing a biological sample, in particular a blood sample. The system comprises a single-use cartridge and an analysis device. Once the sample has been received, the cartridge is inserted into the analysis device in order to carry out the test. The cartridge comprises a microfluidic system and a sensor apparatus comprising electrodes, which apparatus is calibrated by means of a calibration liquid and is then used to test the sample.

Furthermore, International Patent Application Publication WO 2006/125767 A1 and corresponding U.S. Pat. No. 9,110,044 B2 disclose a point-of-care system for integrated and automated DNA or protein analysis, comprising a single-use cartridge and an analysis device for fully automatically processing and evaluating molecular-diagnostic analyses using the single-use cartridge. The cartridge is designed to receive a sample, in particular blood, and in particular allows cell disruption, PCR and detection of PCR amplification products, which are bonded to capture molecules and provided with a label enzyme, in order for it to be possible to detect bonded PCR amplification products or nucleic sequences as target analytes in what is known as a redox cycling process.

U.S. Pat. No. 8,580,569 B2 discloses a feedback control in microfluidic systems. The control of fluids involves the use of feedback from one or more processes or events taking place in the microfluidic system. For instance, a detector may detect one or more fluids at a measurement zone and, using this data, a control system may determine whether to modulate subsequent fluid flow in the microfluidic system. However, there is no hint how to achieve a more flexible use. Moreover, there is no hint regarding any particular evaluation procedures.

U.S. Pat. No. 9,810,704 B2 discloses systems and methods for multi-analysis and sample processing. A device may be provided, capable of receiving the sample, and performing one or more of a sample preparation, sample assay, and detection step. The device may be capable of performing multiple assays. A cartridge may be a universal cartridge that can be configured for the same selection of tests. However, there is no hint regarding whether specific tests can be selected or how the universal cartridge is used. Moreover, there is no hint regarding any particular evaluation procedures.

U.S. Pat. No. 6,709,869 B2 discloses devices and methods for using centripetal acceleration to drive fluid movement in a microfluidics system. The invention provides a microsystem platform and a micromanipulation device for manipulating the platform that utilizes the centripetal force resulting from rotation of the platform to motivate fluid movement through micro-channels. The microsystem platforms are optionally provided having system informatics and data acquisition, analysis and storage and retrieval informatics encoded on the surface of the disk opposite to the surface containing the fluidic components. The platform comprises multiple similar devices. It can be selected to run an exhaustive or limited set of diagnostics. However, as there is no hint how to do this and whether identical tests are selectable. Further, there is no hint regarding evaluation handling apparent. The extent of detail and a method of reporting can be selected, however, this does not mean that an evaluation of measurement results was conducted or influenced.

SUMMARY OF THE INVENTION

Point-of-care systems are generally specifically designed for a particular test, in order to thus provide a compact and therefore transportable form.

The problem addressed by the present invention is to provide a method for testing an in particular biological sample, a computer program product and an analysis system, it being possible to achieve a high level of flexibility and reliability.

This problem is solved by a method and system according to the invention as described herein.

The present invention relates to the testing of an in particular biological sample using an analysis system. For this purpose, the analysis system preferably comprises a cartridge for receiving the sample. Furthermore, the analysis system preferably comprises an analysis device for receiving the cartridge and subsequently carrying out the test using the received cartridge. The present invention is particularly advantageous in this regard; however, it may also be used for other analysis systems, substantially or in part. In the following, however, the invention is always explained on the basis of the preferred analysis system.

For the test supported by the cartridge, the cartridge preferably comprises a sensor apparatus and a fluid system comprising channels for preparing, treating and/or conveying the sample to a sensor apparatus. The test therefore preferably takes place at least substantially or exclusively within the cartridge.

According to one aspect of the present invention, the cartridge supports different tests on the sample, which can also be carried out separately. For this purpose, the sample is conveyed and/or prepared within the cartridge in different ways that are specific to the respective tests.

Using other words, the cartridge preferably supports different tests on the sample meaning that the cartridge is configured such that the sample can be treated differently inside the cartridge such that different test procedures and test results can be obtained. In particular, the cartridge supports different tests by the cartridge being configured such that different assays are enabled due to the construction of the cartridge such that different substances or ingredients of the sample can be detected by means of the cartridge. For that purpose, the sample can be treated differently in or by means of the cartridge for performing the different assays and detecting of different substances or ingredients.

It may thus be provided that the sample is conveyed on different paths formed by channels of the fluid system and/or in different directions and/or differently in another manner. This means that different tests can be carried out. Alternatively, or additionally, the sample is prepared or treated differently, in particular heat-treated differently and/or brought into contact with different reagents. For this purpose, the sample is preferably always transported from a receptacle towards the sensor apparatus as a result, in order to use the sensor apparatus to determine, at this point, specific measured values for the sample that can be evaluated or analyzed subsequently.

Preferably, the same cartridge supports the tests on the sample, which can also be carried out separately. For this purpose, the cartridge is preferably designed, in particular by means of valves and/or by supporting different transport and/or pump directions, to convey, to treat and/or to prepare the sample in different manners and/or on different paths. In particular, the cartridge comprises corresponding reagents for carrying out different tests, comprises one or more different cavities, preferably having different functions, and/or comprises a bypass, in order to bypass portions of the fluid system depending on the selected test.

For example, the cartridge is designed to prepare different components of the sample in different manners in the different tests, in particular by means of different mixing processes, heat treatments and/or by carrying out different reactions.

In particular, on the one hand, the cartridge can support a test in which a PCR is carried out, the sample being or being able to be temperature-controlled in a region provided or designed therefor. On the other hand, in another test a PCR is not carried out and/or the sample is guided past or bypasses a temperature-control region. Alternatively, or additionally, the sample can also be transported through the temperature-control region without temperature-control taking place. In this manner or in another manner, the sample can be prepared and/or treated differently.

In order to carry out the different tests, corresponding pieces of control information are preferably provided for the respective tests. The pieces of control information can be stored in a database and/or can be retrieved from a database.

Therefore, preferably at least two, in particular different, pieces of control information are provided which correspond to the different tests, in particular different tests on the same sample and/or using the same analysis system, the same analysis device and/or the same cartridge. Preferably, using the different tests, different measurement results can be determined and/or different analytes can be detected, in particular measured, when the same sample is used.

Providing a piece of control information preferably means that said piece of control information is made available such that said piece of control information can be provided to and/or used by the analysis device for performing the test or test sequence. In particular, the pieces of control information are stored and can be received or retrieved on demand. However, there are different measures known in the art to provide pieces of control information as well.

A piece of control information preferably corresponds to a test in the sense of the present invention preferably if or when said piece of control information is configured to be used for controlling a test, test sequence, test procedure or test process. Thus, different pieces of control information in the sense of the present invention preferably correspond to different tests, test sequences, test procedures or test processes if the pieces of control information are different in comparison to each other and, respectively, are configured to be used for controlling different tests, test procedures, test sequences or test processes, which in particular are supported by the same cartridge.

Accordingly, it is preferred that the different pieces of control information are configured, in particular containing instructions, parameters or the like, to perform different tests, test sequences, test procedures or test processes the cartridge supports, i.e., the cartridge is configured for said different tests, test sequences, test procedures or test processes to be carried out—preferably by treating the sample differently, transporting the sample differently, mixing it with different substances, heating it differently, performing different reactions with it or the like.

The (different) pieces of control information are preferably designed to be interpreted by the analysis device, whereupon actuators of the analysis device are controlled in the manner specified by the (respective) pieces of control information such that the test is carried out (differently), the sample preferably being conveyed and/or prepared in a specific (different) manner.

Preferably, at least one piece of the control information is or can be selected for carrying out the test using the cartridge. Subsequently, the selected test can be carried out using the analysis system and/or the analysis device and/or the cartridge on the basis of this selected piece of control information. The analysis system therefore preferably supports a selection process between a plurality of possible tests which are supported by the analysis system, the analysis device and/or the cartridge, preferably by selecting the (desired) piece of control information.

Particularly preferably, the analysis device can be controlled using the selected piece of control information. In this respect, the analysis device can preferably be controlled using the selected piece of control information such that the sample is conveyed within the cartridge in a specific manner which corresponds to the selected piece of control information or test. In particular, it is therefore provided that different tests or pieces of control information corresponding thereto are or can be selected and, on the basis of the selected piece of control information, the test corresponding thereto is carried out by the sample being conveyed in the cartridge on the basis of the piece of control information and/or being conveyed within the cartridge in the manner specific to the selected test.

By it being possible to select the piece of control information, it is simply and effectively made possible to carry out different tests using the same analysis system, and optionally using the same cartridge. For example, a cartridge can support both a nucleic-acid assay and a protein assay and, by selecting the piece of control information specific to one of these tests, the analysis device can be controlled such that, using the cartridge, the selected test and/or the test defined by or corresponding to the selected piece of control information is carried out on the sample received in the cartridge. Here, the sample is preferably correspondingly conveyed and/or treated within the cartridge, in order to then be analyzed using the sensor apparatus. Therefore, the present invention allows for a convenient and flexible test.

In another aspect of the present invention, which can also be implemented independently, it is provided that measurement results are determined by carrying out the test using the sensor apparatus of the cartridge. For this purpose, it is in particular provided that the sample, which has preferably been prepared, is fed to the sensor apparatus and sample-specific measurement results are determined, in particular measured, or can be determined, in particular can be measured, by the sensor apparatus.

Different pieces of evaluation information are preferably provided in order to evaluate the measurement results in different manners, in particular in order to obtain different evaluation results, such as characteristic values, indicators or the like.

Providing a piece of evaluation information preferably means that said piece of evaluation information is available such that said piece of evaluation information can be provided to and/or used for performing the evaluation. In particular, the pieces of evaluation information are stored and can be received or retrieved on demand. However, there are different measures known in the art to provide pieces of evaluation information as well.

A piece of evaluation information preferably corresponds to an evaluation in the sense of the present invention preferably if or when said piece of evaluation information is configured to be used for evaluating a measurement result. Said measurement result preferably is a result or outcome of the test, test sequence, test procedure or test process. The measurement result preferably is indicative of a property of the sample, in particular of an analyte contained in the sample.

Different pieces of evaluation information in the sense of the present invention preferably correspond to different evaluations of the same measurement result or of different measurement results, preferably determined using the same cartridge. The pieces of evaluation information are different in comparison to each other and, respectively, are configured to be used for evaluating said measurement results differently.

The measurement results preferably are either the outcome from the same test, test sequence, test procedure or test process or the outcome from one or more tests, test sequences, test procedures or test processes carried out using the same cartridge.

Accordingly, it is preferred that the different pieces of evaluation information are configured, in particular containing instructions, parameters or the like, to perform evaluation of measurement results differently—preferably by processing, computing or calculating based on the measurement results one or more evaluation results, in particular wherein different types and/or concentrations and/or (absolute) quantities of one, and particularly preferably more than one, analyte is or are determined.

Preferably, at least two different pieces of evaluation information are provided for carrying out different evaluations of the measurement results. In order to carry out the different evaluations of the measurement results, at least one piece of the evaluation information is selected and/or used for evaluating the measurement results determined by the test on the sample.

For example, it is possible for different characteristic values, indicators or the like to be determined using the measurement results from the same test. This is, however, often associated with computational effort and waiting time. However, by selecting particular evaluations or pieces of evaluation information corresponding thereto from the entirety of all the evaluations that are possible with the measurement results or that are supported, the present invention makes it possible to carry out only those particular evaluations target-oriented, and to therefore obtain only those corresponding results, that are required at that particular time. In addition, it is possible to evaluate the measurement results in stages. Therefore, it is possible, initially using a first piece of evaluation information, to carry out a first evaluation of the measurement results and, if required, in a second step, to evaluate the same measurement results in another manner using another piece or different pieces of evaluation information, in order to obtain additional or different evaluation results.

"The same measurement results" are preferably measurement results from the same test and/or from the same sample and/or obtained using the same sensor apparatus. This does not exclude the same measurement results being or comprising a set of results, in particular a plurality of individual measured values. It is possible for the same measurement results to comprise different sub-results and, in the different evaluations, for the same results or sub-results to be evaluated using preferably different methods, or for different sub-results to be evaluated using the same or different methods.

The cartridge preferably comprises a sensor apparatus, which tests the sample in such a way that measurement results which are generated by the sensor apparatus during sample testing can be evaluated in different manners.

The sensor apparatus or a sensor array thereof preferably comprises multiple sensor fields and/or electrodes for specifically bonding and/or detecting one or more analytes to be detected or measured. Further, the sensor apparatus preferably is configured for electrical or electrochemical detection of analytes of the sample.

Alternatively, or additionally, the sensor apparatus and/or the sensor device can be configured for detecting or measuring other or further analytes compounds, material characteristics, or the like without specific bonding and/or by means of optical measurement, impedance measurement, capacitance measurement, spectrometric measurement, mass spectrometric measurement, or tomography, like Magnetic Resonance Tomography (MRT). In this regard, the sensor apparatus, thus, can be formed by an arrangement enabling such measurement. In particular, the sensor apparatus or cartridge or any other sample carrier of the analysis device or system can comprise or form a cavity having a window for said optical measurement. The optical sensor or the sensor apparatus, such as a spectrometer, can be realized independently of the cartridge and/or can form part of the analysis device.

In the following, the present invention is explained based primarily on the sensor apparatus having multiple sensor fields and/or being or comprising a chip having electrodes for electrochemical detection. However, unless stated or conductible unambiguously to the contrary, it is to be understood that measurement results alternatively or additionally can be achieved by or can be the outcome of one or more of the above mentioned measurement techniques even if not mentioned explicitly.

The sensor apparatus may comprise a plurality of sensor fields, different tests being able to be carried out on the sample with said sensor fields. Accordingly, the different pieces of evaluation information may comprise instructions on choosing or selecting certain sensor fields, and therefore only certain sensor fields are evaluated and other sensor fields are disregarded. Alternatively, or additionally, the (different) pieces of evaluation information may, however, also contain instructions regarding the manner in which to evaluate measurement results from the same sensor fields in different ways, in order to thereby generate different evaluation results.

The piece/pieces of control information and/or evaluation information is/are particularly preferably selected by an operating instrument that is in particular designed to be separated and/or disconnected from the analysis device or is separable or disconnectable from the analysis device, in particular with respect to a data connection and/or physically. The different pieces of control information and/or evaluation information can be stored on the operating instrument for selection. Alternatively, or additionally, the different pieces of control information and/or evaluation information are stored in an external database, to which the control instrument is or can be connected by a data connection.

Particular pieces of control information and/or evaluation information can be selected using the operating instrument. For this purpose, a selection of possible pieces of control information and/or evaluation information can be output by the operating instrument, in particular an output apparatus, and can be displayed for selection. A selection can then be made by the operating instrument, in particular by means of an input apparatus thereof.

Subsequently or as a result, the (selected) piece/pieces of control information and/or evaluation information can be retrieved from the database. The piece/pieces of control information is/are preferably transmitted to the analysis device in order to carry out the test. The piece/pieces of evaluation information is/are preferably used by the operating instrument to evaluate measurement results received from the analysis device.

Another aspect of the present invention, which can also be implemented independently, relates to a computer program product comprising program code means which, when executed, for example by a processor, computer, microcontroller or one or more other data processing apparatus for executing the program code means, in particular of the operating instrument and/or of the analysis device, cause the method steps or the method according to the present invention to be carried out. The computer program product preferably is a non-transitory computer-readable media.

Another aspect of the present invention, which can also be implemented independently, relates to an analysis system, which is designed to carry out the method.

Here, the analysis system, in particular the cartridge thereof, supports different tests on the sample, which can also be carried out separately, the sample being conveyed, treated and/or prepared for the different tests within the cartridge in different manners that are specific to the respective tests.

Furthermore, at least two different pieces of control information are provided that correspond to the different tests. At least one piece or certain pieces of the control information can be selected for carrying out the test using the cartridge. Furthermore, the analysis device can be controlled using the selected piece of control information, and therefore the sample is conveyed, treated and/or prepared within the cartridge in the manner that is specific to the test corresponding to the selected piece of control information.

Alternatively, or additionally, measurement results can be determined using the sensor apparatus of the cartridge by means of the test, and at least two different pieces of evaluation information are provided for carrying out different evaluations of the measurement results. It is provided here that at least one piece of the evaluation information can be selected for evaluating the measurement results that are determined by the test on the sample.

The term "piece of control information" is preferably understood to mean one or more data sets, files or other units that correspond to the control of a preferably complete test sequence. For this purpose, the piece of control information and/or data sets, files or other units in particular comprises parameters and/or instructions for controlling the (entire) test. If reference is being made to different pieces of control information, these are particularly preferably different data sets, files or other units that are preferably designed to carry out different (complete) tests. Selecting particular pieces of control information therefore preferably corresponds to selecting one or more of the different data sets, files or other units. If required, the term "piece of control information" or "pieces of control information" can therefore be substituted with one or more of the terms or the expression "data sets, files and/or other units comprising one or more pieces of control information".

The term "test" as used herein preferably means a test procedure and/or performing an assay, in particular one, several or all steps for performing an assay to determine one or more analytes of a sample. The steps are preferably realized by or within the analysis system, analysis device and/or cartridge.

An "assay" according to the present invention is preferably an investigative procedure for qualitatively and/or quantitatively measuring, detecting and/or identifying the presence, amount, and/or functional activity of a target entity or analyte of the sample. The analyte can, e.g., be a drug, a biological, chemical and/or biochemical substance, and/or a cell in an organism or organic sample. In particular, the analyte can be a molecule, a nucleic-acid sequence, a DNA, an RNA and/or a protein.

Preferably, the assay according to the present invention is a nucleic-acid assay for detecting or identifying a nucleic-acid sequence and/or a protein assay for detecting or identifying a protein.

An assay, test or test procedure according to the present invention accordingly preferably covers at least one of: controlling actuators of the analysis device like a pump drive, temperature control apparatus, and valve actuators; acting on the cartridge or sample; treating the sample; preparing the sample; performing one or more mixing processes and/or reactions with the sample; conveying the sample; and measuring one or more properties of the sample, particularly with the sensor apparatus of the cartridge.

An assay, test or test procedure according to the present invention preferably starts or begins with the analysis device acting on and/or controlling processes on the cartridge and/or the sample. In particular, a test starts or begins with actuators acting on the cartridge. For example, a test can start with conveying the sample within the cartridge.

Methods and/or steps performed before insertion or receiving of the cartridge into/by the analysis device and/or before conveying, treating and/or preparing the sample within said cartridge are preferably not part of an assay, test or test procedure according to the present invention.

The "piece of control information", thus, preferably is configured to carry out such an assay, test or test procedure or to enable the analysis system or the analysis device to carry out such an assay, test or test procedure. Preferably, said piece of control information is configured to control or to define a control sequence or to be used by the analysis device to carry out said assay, test or test procedure. A "piece of control information", thus, preferably has instructions being configured for controlling the assay, test or test procedure. In particular, the piece of control information is configured to control an assay, test or test procedure by defining steps or parameters of steps including controlling and/or feedback controlling actuators like the pump drive, the temperature control apparatus and valve actuators.

The term "piece of evaluation information" is preferably understood to mean one or more data sets, files or other units that are provided and suitable for evaluating measurement results, preferably from the sensor arrangement. For this purpose, the piece of evaluation information and/or data sets, files or other units in particular comprise instructions, algorithms, assignment means and/or parameters for carrying out the evaluation, in particular by means of computational operations, for example using a processor or controller.

If herein reference is made to different pieces of evaluation information, these are particularly preferably different data sets, files or other units that are preferably designed to carry out different evaluation processes. Selecting particular pieces of evaluation information therefore preferably corresponds to selecting one or more of the different data sets, files or other units. If required, the term "piece of evaluation information" or "pieces of evaluation information" can therefore be substituted with one or more of the terms or the expression "data sets, files and/or other units comprising one or more pieces of evaluation information".

The term "analysis device" is preferably understood to mean an instrument which is in particular mobile, can be used on site, is supplied with energy by an internal energy storage means and/or is autonomous, and is designed to chemically, biologically and/or physically test and/or analyze a sample or a component thereof, preferably in and/or by means of a cartridge. In particular, the analysis device controls the pretreatment and/or testing of the sample in the cartridge. For this purpose, the analysis device can act on the cartridge, in particular such that the sample is conveyed, temperature-controlled and/or measured in the cartridge.

The term "cartridge" is preferably understood to mean a structural apparatus or unit designed to receive, to store, to physically, chemically and/or biologically treat and/or prepare and/or to measure a sample, preferably in order to make it possible to detect, identify or determine at least one analyte, in particular a protein and/or a nucleic-acid sequence, of the sample.

A cartridge within the meaning of the present invention preferably comprises a fluid system having a plurality of channels, cavities and/or valves for controlling the flow through the channels and/or cavities.

In particular, within the meaning of the present invention, a cartridge is designed to be at least substantially planar, flat and/or card-like, in particular is designed as a (micro)fluidic card and/or is designed as a main body or container that can preferably be closed and/or said cartridge can be inserted and/or plugged into a proposed analysis device when it contains the sample.

The term "operating instrument" is preferably understood to mean an apparatus by means of which the analysis device can be controlled, pieces of control information can be transmitted to the analysis device, and/or measurement results can be received from the analysis device and/or measurement results can be evaluated. Preferably, the operating instrument is or forms a user interface for controlling the test and/or the evaluation or outputting of measurement results.

The operating instrument can alternatively be called operator control instrument. The operating instrument preferably is configured to be operated by an operator (user) for controlling, in particular of the analysis device, the test and/or the evaluation. Thus, the operating instrument is or comprises a user interface for input of commands and transfer of pieces of control information to the analysis device.

The operating instrument preferably comprises an input apparatus for controlling the analysis device, for controlling data transmission and/or for controlling the evaluation of measurement results. Alternatively, or additionally, the operating instrument comprises an output apparatus for outputting, in particular displaying, information or pieces of information, in particular (pieces of) status information, operating elements and/or results. The operating instrument preferably comprises a processor, microcontroller and/or memory for executing a computer program product for data transmission, for control and/or for evaluating measurement results.

Particularly preferably, the operating instrument is a mobile terminal device, in particular for a radio and/or mobile network, such as a smartphone, tablet computer, mobile telephone or the like. The operating instrument can preferably be operated independently from a power network, using a power storage means, in particular a (rechargeable) battery, and in a mobile manner, autonomously of and/or independently from further components of the analysis system, in particular the analysis device. The operating instrument preferably comprises one or more interfaces for wireless data communications, in particular a WPAN communication interface, a WLAN communication interface, a near-field communication interface, an optical communication interface such as a camera, and/or a mobile radio interface.

According to one aspect of the present invention, at least one piece or certain pieces of the control information is/are selected for carrying out the test. Alternatively, or additionally, at least one piece or certain pieces of the evaluation information is/are selected for carrying out the evaluation.

The analysis device can be provided with the selected piece of control information and the analysis device can perform the test, test procedure, test process or test sequence as defined by the selected piece of control information, in particular to carry out the steps with the analysis system to prepare, treat and/or convey the sample according to said selected piece of control information.

The selected piece of evaluation information preferably is intended to be used for the evaluation of the measurement results obtained with the test, test procedure, test process or test sequence, in particular for conducting it or for controlling the analysis system, in particular the operating instrument, to carry out the evaluation as defined by the selected piece of evaluation information.

Thus, the operating instrument can be provided with the selected piece of evaluation information and the operating instrument can perform the evaluation as defined by the selected piece of evaluation information, in particular can carry out the steps with the analysis system to compute or calculate according to said selected piece of control evaluation results like presence and/or concentration of one or multiple analytes from the measurement results.

In the following, the term "piece of information" is used to abbreviate the term "piece of control information and/or piece of evaluation information". Further, the term "piece of information" might cover different pieces of information like "piece of calibration information". Thus, the term "piece of information" might be replaced accordingly.

Selecting a piece of information (i.e., control or evaluation information) preferably means or selection preferably is conducted or covers that said piece of information is identified among further pieces of information.

Preferably, a piece of information by selecting is marked, for example using a flag. Alternatively, or additionally, selecting a piece of information means or covers generating and/or receiving a command, in particular a user command which can be initiated by a user, transmitting the command, and/or using the command corresponding to or identifying said piece of information. Using this command, the piece of information can be retrieved, caused to be transmitted, and/or used to perform the test, test sequence, test procedure or test process or the evaluation.

However, according to one aspect of the present invention, executing this command, retrieving the piece of information, transmitting the piece of information, and/or using the piece of information preferably is enabled and/or conducted only under certain conditions, in particular, a verification and/or unblocking.

Preferably there are blocked and unblocked pieces of information provided, in particular stored in a database, and the system is configured that only the unblocked pieces of information are enabled, i.e., can be retrieved, transmitted, and/or used to perform the test, test sequence, test procedure or test process or evaluation.

The system further is preferably configured to disable, i.e., prevent retrieval of pieces of information, transmission of pieces of information and/or performing the test, test sequence, test procedure or test or evaluation process with pieces of information when said pieces of information are blocked. That is, blocked pieces of information are disabled for retrieval and/or use by the analysis system, while unblocked pieces of information are enabled to be retrieved and/or used.

Preferably, different pieces of information are stored in a database for the same cartridge and/or measurement results. In other words, different pieces of control information, which are configured to perform different tests, test sequences, test procedures or test processes using the same cartridge or different pieces of evaluation information which are configured to perform different evaluations of the same measurement results, are stored in the database.

Preferably, only certain ones of said pieces of information stored in the database is or are enabled for retrieval provided that the certain piece or pieces of information is/are compatible and/or unblocked for a specific cartridge.

Alternatively, or additionally, the analysis system, analysis device and/or operating instrument uses only the certain pieces of information being enabled provided that the certain pieces of information are unblocked and/or compatible to the cartridge and/or measurement results. That is, preferably only those pieces of information can be or are unblocked or unblockable that are compatible with a specific cartridge or specific measurement results, in particular measurement results of a specific test using a specific cartridge.

Alternatively, or additionally, only certain ones of the pieces of information stored in the database is or are enabled for retrieval provided that a user, the operating instrument, the analysis device and/or analysis system has a permission for the certain piece or pieces of information. This permission can be represented by a status or data like a flag or identifier of or stored in the database or the piece of information.

Particularly preferably, only certain pieces of information stored in the database is or are enabled for retrieval provided that said certain ones of said certain pieces of information are compatible with the cartridge and/or measurement results as well as provided that a user, the operating instrument, the analysis device and/or analysis system has a permission for the certain piece or pieces of information. Each can be checked, preferably by the database, before or in order to unblock a certain piece of information.

According to this aspect, there are multiple pieces of control information being stored in a data base and being configured to control different tests, test sequences, test processes or test procedures using the same cartridge. Some of those stored pieces of control information are unblocked and, thus, enabled for retrieval and/or to be used by the analysis device to perform the test this piece of control information defines.

On the other hand, different of said multiple pieces of control information being generally compatible with the same cartridge and being stored in said data base as well, are blocked and, thus, are prevented from being retrieved and/or used for a test, test sequence, test procedure or test process.

Alternatively, or additionally, there are multiple pieces of evaluation information being stored in a/the database and being configured to define different evaluations/evaluation procedures using the same measurement results. Some of those stored pieces of evaluation information are unblocked and, thus, enabled for retrieval and/or to be used to perform the evaluation this piece of control information defines.

On the other hand, different pieces of evaluation information being generally compatible with the same measurement results and being stored in said database as well, are blocked and, thus, are prevented from being retrieved and/or used for an evaluation.

Pieces of information preferably are enabled for retrieval according to the present invention when said pieces of information are made available to be downloaded from the database, preferably to be used for controlling a test, test sequence, test process or test procedure and/or evaluation as defined by this piece of information.

Using only certain pieces of information being enabled in the sense of the present invention preferably means that the analysis system or one or more of its components like the database, the analysis device or the operating instrument is or are configured to conduct a test, test sequence, test process or test procedure or evaluation as defined by this piece of information only under the condition that it is enabled/unblocked.

Enabled or enabled for retrieval preferably means that it is not disabled or blocked. With other words, enabled means that retrieval and/or use of a certain piece of information is supported by the analysis system, i.e., the analysis system is configured to directly use enabled certain pieces of information for controlling a test, test sequence, test procedure or test process or for evaluation of measurement results.

Pieces of control information generally can be blocked and unblocked for a specific cartridge. This preferably means that certain pieces of control information can be blocked, i.e., prevented to be retrieved and/or to be used for a test, test process, test procedure or test sequence. On the other hand, different pieces of control information can be unblocked in the sense that retrieval or use for a test, test sequence, test process or test procedure is enabled.

Pieces of evaluation information generally can be blocked and unblocked for a measurement result and/or cartridge. This preferably means that certain pieces of evaluation information can be blocked, i.e., prevented to be retrieved and/or to be used for evaluation. On the other hand, different pieces of evaluation information can be unblocked in the sense that retrieval or use for a test, test sequence, test process or test procedure is enabled.

The status "blocked" and "unblocked" can be realized or indicated by a flag or data assigned to the respective piece of information. Means can be provided by or within the analysis system to change the status that a certain piece of information is blocked or unblocked. As soon as a certain piece of information is unblocked—meaning changed from a blocked status to an unblocked status, retrieval and use of it is enabled.

Blocking and unblocking, for example, can be realized by a verification process. In particular, the status can change from blocked to unblocked depending on confirmation of an identification and/or of an entitlement.

Said entitlement can be a flag or data assigned to a user or his verification means like an identification. Alternatively, or additionally, said entitlement can be, relate to, correspond to or depend on a specific cartridge or cartridge identifier or cartridge identification.

The blocking or unblocking can depend or the analysis system can be configured to control or change blocking or unblocking depending on both, a cartridge and user identification.

Alternatively, or additionally, blocking or unblocking can depend on or controlled under the condition that a cartridge has specific properties and/or specific properties related to said cartridge identify an entitlement to use a specific piece of information which, accordingly, is unblocked.

This entitlement, blocking and/or unblocking preferably can be changed or amended. For example, a user input, in particular via the operating instrument, can automatically unblock a certain piece of control information. A password, biometric or operating device verification might be a condition for unblocking.

The analysis system can be configured to conduct unblocking only under other and/or further conditions like compatibility of a specific piece of control information to a specific or identified cartridge, and/or further or different boundary conditions like payment information. In particular, unblocking automatically results in update of an account, in particular of a payment or debit account, or in another payment or debit process or the system is configured or a method is realized that this is a precondition for or result caused by or coming along with unblocking.

The above-mentioned aspects and features of the present invention and the aspects and features of the present invention that will become apparent from the claims and the following description can in principle be implemented independently from one another, but also in any combination or order.

Other aspects, advantages, features and properties of the present invention will become apparent from the following description of a preferred embodiment with reference to the accompanying drawings.

DETAILED DESCRIPTION OF THE INVENTION

In the figures, which are only schematic and sometimes not to scale, the same reference signs are used for the same or similar parts and components, corresponding or comparable properties and advantages being achieved even if these are not repeatedly described.

Figure 1:
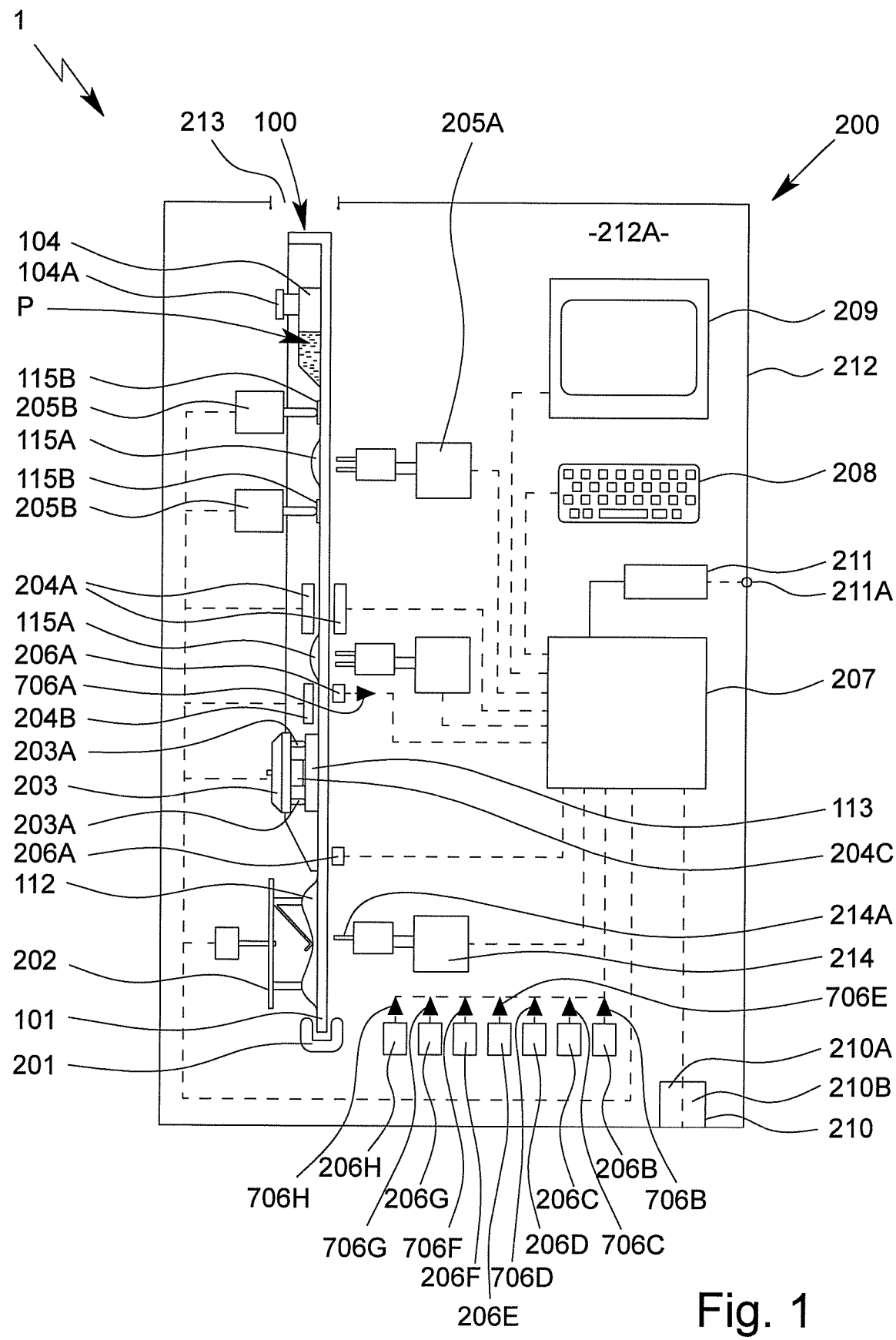
FIG. 1 is a schematic view of a proposed analysis system and/or analysis device comprising a proposed cartridge received therein.

FIG. 1 is a highly schematic view of a proposed analysis system 1 and analysis device 200 for testing an in particular biological sample P, preferably by means of or in an apparatus or cartridge 100.

Figure 2:
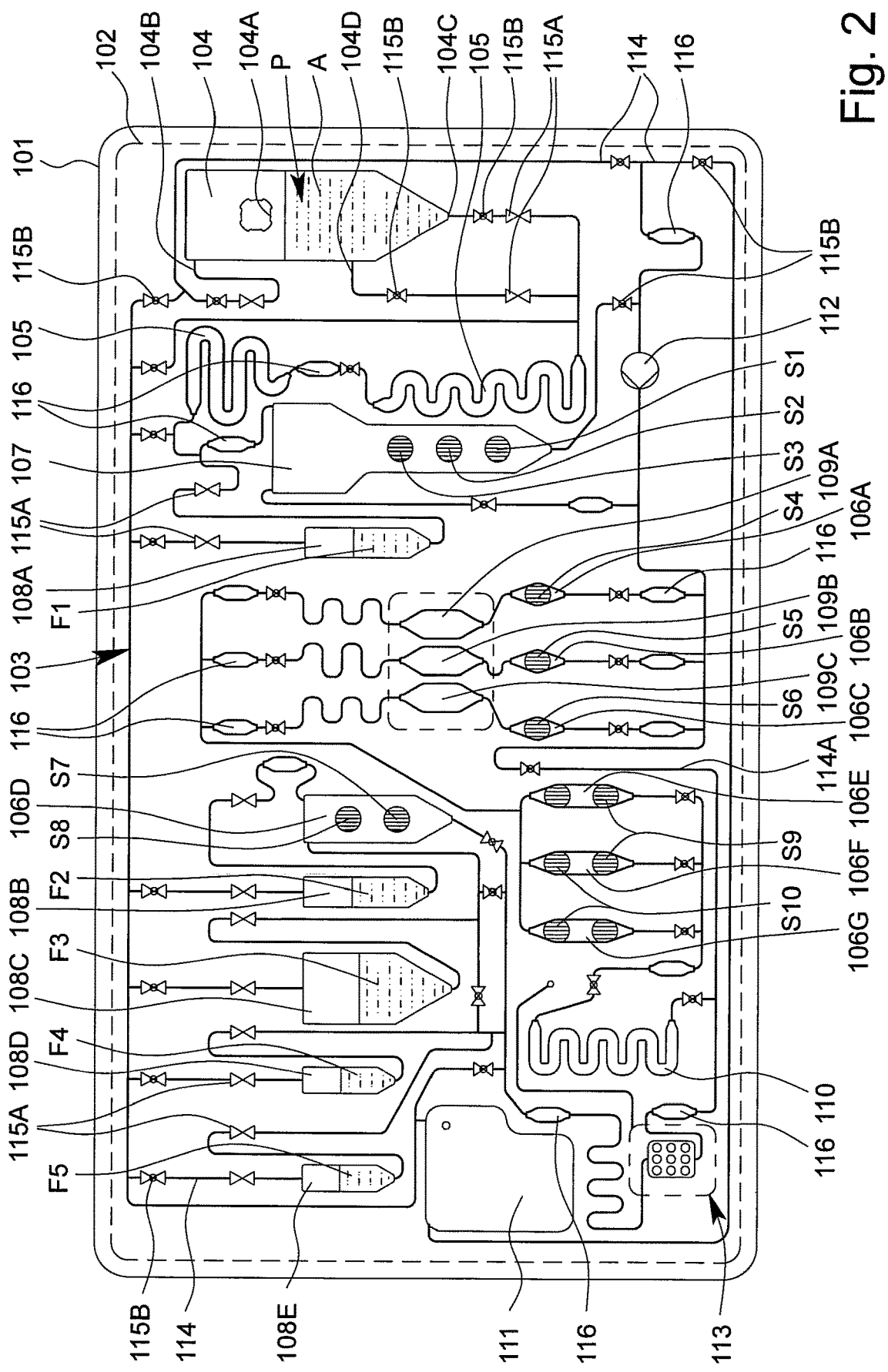
FIG. 2 is a schematic view of the cartridge.

FIG. 2 is a schematic view of a preferred embodiment of the proposed apparatus or cartridge 100 for testing the sample P. The apparatus or cartridge 100 in particular forms a handheld unit, and in the following is merely referred to as a cartridge.

The term "sample" is preferably understood to mean the sample material to be tested, which is in particular taken from a human or animal. In particular, within the meaning of the present invention, a sample is a fluid, such as saliva, blood, urine or another liquid, preferably from a human or animal, or a component thereof. Within the meaning of the present invention, a sample may be pretreated or prepared if necessary, or may come directly from a human or animal or the like, for example. A food sample, environmental sample or another sample may optionally also be tested, in particular for environmental analytics, food safety and/or for detecting other substances, preferably natural substances, but also biological or chemical warfare agents, poisons or the like.

Preferably, the analysis system 1 and/or analysis device 200 controls the testing of the sample P in particular in or on the cartridge 100 and/or is used to evaluate the testing and/or to collect, to process and/or to store measured values from the test.

The analysis system 1 preferably comprises one or more cartridges 100 for receiving the sample P.

The analysis system 1 preferably comprises the analysis device 200 for receiving the cartridge 100 and subsequently carrying out the test using the received cartridge 100.

By means of the proposed analysis system 1, analysis device 200 and/or cartridge 100 and/or using the proposed method for testing the sample P, preferably an analyte A of the sample P, in particular a (certain) nucleic-acid sequence and/or a (certain) protein, or particularly preferably a plurality of analytes A of the sample P, can be determined, identified or detected. Said analytes A are in particular detected, identified and/or measured not only qualitatively, but particularly preferably also quantitatively.

Therefore, the sample P can in particular be tested for qualitatively or quantitatively determining at least one analyte A, for example in order for it to be possible to detect a disease and/or pathogen or to determine other values, which are important for diagnostics, for example.

Particularly preferably, a molecular-biological test is made possible by means of the analysis system 1 and/or analysis device 200 and/or by means of the cartridge 100.

Particularly preferably, a nucleic-acid assay for detecting a nucleic-acid sequence, in particular a DNA sequence and/or RNA sequence, and/or a protein assay for detecting a protein, in particular an antigen and/or antibody, are made possible or are carried out.

Preferably, the sample P or individual components of the sample P or analyte A can be amplified if necessary, in particular by means of PCR, and tested, identified or detected in the analysis system 1, analysis device 200 and/or in the cartridge 100, and/or for the purpose of carrying out the nucleic-acid assay. Preferably, amplification products of the analyte A or analytes A are thus produced.

In the following, further details are first given on a preferred construction of the cartridge 100, with features of the cartridge 100 preferably also directly representing features of the analysis system 1, in particular even without any further explicit explanation.

The cartridge 100 is preferably at least substantially planar, flat, plate-shaped and/or card-like.

The cartridge 100 preferably comprises an in particular at least substantially planar, flat, plate-shaped and/or card-like main body or support 101, the main body or support 101 in particular being made of and/or injection-molded from plastics material, particularly preferably polypropylene.

The cartridge 100 preferably comprises at least one film or cover 102 for covering the main body 101 and/or cavities and/or channels formed therein at least in part, in particular on the front, and/or for forming valves or the like, as shown by dashed lines in FIG. 2.

The analysis system 1 or cartridge 100 or the main body 101 thereof, in particular together with the cover 102, preferably forms and/or comprises a fluidic system 103, referred to in the following as the fluid system 103.

The cartridge 100, the main body 101 and/or the fluid system 103 are preferably at least substantially vertically oriented in the operating position and/or during the test, in particular in the analysis device 200, as shown schematically in FIG. 1. In particular, the main plane or surface extension of the cartridge 100 thus extends at least substantially vertically in the operating position.

The cartridge 100 and/or the fluid system 103 preferably comprises a plurality of cavities, in particular at least one receiving cavity 104, at least one metering cavity 105, at least one intermediate cavity 106A-G, at least one mixing cavity 107, at least one storage cavity 108, at least one reaction cavity 109A-C, at least one intermediate temperature-control cavity 110 and/or at least one collection cavity 111, as shown in FIG. 1 and FIG. 2.

The cartridge 100 and/or the fluid system 103 also preferably comprises at least one pump apparatus 112 and/or at least one sensor arrangement or sensor apparatus 113.

Some, most or all of the cavities are preferably formed by chambers and/or channels or other depressions in the cartridge 100 and/or the main body 101, and particularly preferably are covered or closed by the cover 102. However, other structural solutions are also possible.

In the example shown, the cartridge 100 or the fluid system 103 preferably comprises two metering cavities 105, a plurality of intermediate cavities 106A to 106G, a plurality of storage cavities 108A to 108E and a plurality of reaction cavities 109A-C, which can preferably be loaded separately from one another, in particular a first reaction cavity 109A, a second reaction cavity 109B and an optional third reaction cavity 109C, as can be seen in FIG. 2.

The reaction cavity/cavities 109A-C is/are used in particular to carry out an amplification reaction, in particular PCR, or several, preferably different, amplification reactions, in particular PCRs. It is preferable to carry out several, preferably different, PCRs, i.e., PCRs having different primer combinations or primer pairs, in parallel and/or independently and/or in different reaction cavities 109A-C.

To carry out the nucleic-acid assay, preferably nucleic-acid sequences, as analytes A of the sample P, are amplified in the reaction cavity/cavities 109A-C by means of an amplification reaction, in particular in order to produce amplification products for the subsequent detection in the sensor arrangement or sensor apparatus 113.

Within the meaning of the present invention, amplification reactions are in particular molecular-biological reactions in which an analyte A, in particular a nucleic-acid sequence, is amplified/copied and/or in which amplification products, in particular nucleic-acid products, of an analyte A are produced. Particularly preferably, PCRs are amplification reactions within the meaning of the present invention.

"PCR" stands for polymerase chain reaction and is a molecular-biological method by means of which certain analytes A, in particular portions of RNA or RNA sequences or DNA or DNA sequences, of a sample P are amplified, preferably in several cycles, using polymerases or enzymes, in particular in order to then test and/or detect the amplification products or nucleic-acid products. If RNA is intended to be tested and/or amplified, before the PCR is carried out, a cDNA is produced starting from the RNA, in particular using reverse transcriptase. The cDNA is used as a template for the subsequent PCR.

Preferably, during a PCR, a sample P is first denatured by the addition of heat in order to separate the strands of DNA or cDNA. Preferably, primers or nucleotides are then deposited on the separated single strands of DNA or cDNA, and a desired DNA or cDNA sequence is replicated by means of polymerase and/or the missing strand is replaced by means of polymerase. This process is preferably repeated in a plurality of cycles until the desired quantity of the DNA or cDNA sequence is available.

For the PCR, marker primers are preferably used, i.e., primers which (additionally) produce a marker or a label, in particular biotin, on the amplified analyte A or amplification product. This allows or facilitates detection. Preferably, the primers used are biotinylated and/or comprise or form in particular covalently bonded biotin as the label.

The amplification products and/or other portions of the sample P produced in the one or more reaction cavities 109A-C can be conducted or fed to the connected sensor arrangement or sensor apparatus 113, in particular by means of the pump apparatus 112.

The sensor apparatus 113 is used in particular for detecting, particularly preferably qualitatively and/or quantitatively determining, the analyte A or analytes A of the sample P, in this case particularly preferably the nucleic-acid sequences and/or proteins as the analytes A. Alternatively, or additionally, however, other values may also be collected or determined.

As already explained at the outset, in particular nucleic-acid sequences, preferably DNA sequences and/or RNA sequences, and/or proteins, in particular antigens and/or antibodies, are preferably qualitatively and/or quantitatively determined as analytes A of the sample P. In the following, however, a distinction is not made between nucleic-acid sequences and proteins, or between the nucleic-acid assay for detecting nucleic-acid sequences and the protein assay for detecting proteins.

In particular, the pump apparatus 112 comprises or forms a tube-like or bead-like raised portion, in particular by means of the film or cover 102, particularly preferably on the back of the cartridge 100, as shown schematically in FIG. 1.

The cartridge 100, the main body 101 and/or the fluid system 103 preferably comprise a plurality of channels 114 and/or valves 115A, 115B, as shown in FIG. 2.

By means of the channels 114 and/or valves 115A, 115B, the cavities 104 to 111, the pump apparatus 112 and/or the sensor arrangement and/or sensor apparatus 113 can be temporarily and/or permanently fluidically interconnected and/or fluidically separated from one another, as required and/or optionally or selectively, in particular such that they are controlled by the analysis system 1 or the analysis device 200.

The cavities 104 to 111 are preferably each fluidically linked or interconnected by a plurality of channels 114. Particularly preferably, each cavity is linked or connected by at least two associated channels 114, in order to make it possible for fluid to fill, flow through and/or drain from the respective cavities as required.

The fluid transport or the fluid system 103 is preferably not based on capillary forces, or is not exclusively based on said forces, but in particular is essentially based on the effects of gravity and/or pumping forces and/or compressive forces and/or suction forces that arise, which are particularly preferably generated by the pump or pump apparatus 112. In this case, the flows of fluid or the fluid transport and the metering are controlled by accordingly opening and closing the valves 115A, 115B and/or by accordingly operating the pump or pump apparatus 112, in particular by means of a pump drive 202 of the analysis device 200.

Preferably, each of the cavities 104 to 110 has an inlet at the top and an outlet at the bottom in the operating position. Therefore, if required, only liquid from the respective cavities can be removed via the outlet.

In the operating position, the liquids from the respective cavities are preferably removed, in particular drawn out, via the outlet that is at the bottom in each case, it preferably being possible for gas or air to flow and/or be pumped into the respective cavities via the inlet that is in particular at the top. In particular, relevant vacuums in the cavities can thus be prevented or at least minimized when conveying the liquids.

In particular, the cavities, particularly preferably the storage cavity/cavities 108, the mixing cavity 107 and/or the receiving cavity 104, are each dimensioned and/or oriented in the normal operating position such that, when said cavities are filled with liquid, bubbles of gas or air that may potentially form rise upwards in the operating position, such that the liquid collects above the outlet without bubbles. However, other solutions are also possible here.

The receiving cavity 104 preferably comprises a connection 104A for introducing the sample P. In particular, the sample P may for example be introduced into the receiving cavity 104 and/or cartridge 100 via the connection 104A by means of a pipette, syringe or other instrument.

The receiving cavity 104 preferably comprises an inlet 104B, an outlet 104C and an optional intermediate connection 104D, it preferably being possible for the sample P or a portion thereof to be removed and/or conveyed further via the outlet 104C and/or the optional intermediate connection 104D. Gas, air or another fluid can flow in and/or be pumped in via the inlet 104B, as already explained.

Preferably, the sample P or a portion thereof can be removed, optionally and/or depending on the assay to be carried out, via the outlet 104C or the optional intermediate connection 104D of the receiving cavity 104. In particular, a supernatant of the sample P, such as blood plasma or blood serum, can be conducted away or removed via the optional intermediate connection 104D, in particular for carrying out the protein assay.

Preferably, at least one valve 115A, 115B is assigned to each cavity, the pump apparatus 112 and/or the sensor apparatus 113 and/or is arranged upstream of the respective inlets and/or downstream of the respective outlets.

Preferably, the cavities 104 to 111 or sequences of cavities 104 to 111, through which fluid flows in series or in succession for example, can be selectively released and/or fluid can selectively flow therethrough by the assigned valves 115A, 115B being actuated, and/or said cavities can be fluidically connected to the fluid system 103 and/or to other cavities.

In particular, the valves 115A, 115B are formed by the main body 101 and the film or cover 102 and/or are formed in another manner, for example by additional layers, depressions or the like.

Particularly preferably, one or more valves 115A are provided which are preferably tightly closed initially or in the storage state, particularly preferably in order to seal liquids or liquid reagents F, located in the storage cavities 108, and/or the fluid system 103 from the open receiving cavity 104 in a storage-stable manner.

Preferably, an initially closed valve 115A is arranged upstream and downstream of each storage cavity 108. Said valves are preferably only opened, in particular automatically, when the cartridge 100 is actually being used and/or while inserting the cartridge 100 into the analysis device 200 and/or for carrying out the assay.

A plurality of valves 115A, in particular three valves in this case, are preferably assigned to the receiving cavity 104, in particular if the intermediate connection 104D is provided in addition to the inlet 104B and the outlet 104C. Depending on the use, in addition to the valve 115A at the inlet 104B, then preferably only the valve 115A either at the outlet 104C or at the intermediate connection 104D is opened.

The valves 115A assigned to the receiving cavity 104 seal the fluid system 103 and/or the cartridge 100 in particular fluidically and/or in a gas-tight manner until the sample P is inserted and the receiving cavity 104 or a connection 104A of the receiving cavity 104 is closed.

As an alternative or in addition to the valves 115A (which are initially closed), one or more valves 115B are preferably provided which are not closed in a storage-stable manner and/or which are open initially and/or which can be closed by actuation. These valves are used in particular to control the flows of fluid during the test.

The cartridge 100 is preferably designed as a microfluidic card and/or the fluid system 103 is preferably designed as a microfluidic system. In the present invention, the term "microfluidic" is preferably understood to mean that the respective volumes of individual cavities, some of the cavities or all of the cavities 104 to 111 and/or channels 114 are, separately or cumulatively, less than 5 ml or 2 ml, particularly preferably less than 1 ml or 800 µl, in particular less than 600 µl or 300 µl, more particularly preferably less than 200 µl or 100 µl.

Particularly preferably, a sample P having a maximum volume of 5 ml, 2 ml or 1 ml can be introduced into the cartridge 100 and/or the fluid system 103, in particular the receiving cavity 104.

Reagents and liquids which are preferably introduced or provided before the test in liquid form as liquids or liquid reagents F and/or in dry form as dry reagents S are required for testing the sample P, as shown in the schematic view according to FIG. 2 by reference signs F1 to F5 and S1 to S10.

Furthermore, other liquids F, in particular in the form of a wash buffer, solvent for dry reagents S and/or a substrate, for example in order to form detection molecules and/or a redox system, are also preferably required for the test, the detection process and/or for other purposes, and are in particular provided in the cartridge 100, i.e., are likewise introduced before use, in particular before delivery. At some points in the following, a distinction is not made between liquid reagents and other liquids, and therefore the respective explanations are accordingly also mutually applicable.

The analysis system 1 or the cartridge 100 preferably contains all the reagents and liquids required for pre-treating the sample P and/or for carrying out the test or assay, in particular for carrying out one or more amplification reactions or PCRs, and therefore, particularly preferably, it is only necessary to receive the optionally pretreated sample P.

The cartridge 100 or the fluid system 103 preferably comprises a bypass 114A that can optionally be used, in order for it to be possible, if necessary, to conduct or convey the sample P or components thereof past the reaction cavities 109A-C and/or, by bypassing the optional intermediate temperature-control cavity 110, also directly to the sensor apparatus 113.

The cartridge 100, the fluid system 103 and/or the channels 114 preferably comprise sensor portions 116 or other apparatus for detecting liquid fronts and/or flows of fluid.

It is noted that various components, such as the channels 114, the valves 115A, 115B, in particular the valves 115A that are initially closed and the valves 115B that are initially open, and the sensor portions 116 in FIG. 2 are, for reasons of clarity, only labelled in some cases, but the same symbols are used in FIG. 2 for each of these components.

The collection cavity 111 is preferably used for receiving excess or used reagents and liquids and volumes of the sample, and/or for providing gas or air in order to empty individual cavities and/or channels.

In particular, the collection cavity 111 can optionally be connected to individual cavities and channels or other apparatus fluidically in order to remove reagents and liquids from said cavities, channels or other apparatus and/or to replace said reagents and liquids with gas or air. The collection cavity 111 is preferably given appropriate large dimensions.

Once the sample P has been introduced into the receiving cavity 104 and the connection 104A has been closed, the cartridge 100 can be inserted into and/or received in the proposed analysis device 200 in order to test the sample P, as shown in FIG. 1. Alternatively, the sample P could also be fed in later.

FIG. 1 shows the analysis system 1 in a ready-to-use state for carrying out a test or assay on the sample P received in the cartridge 100. In this state, the cartridge 100 is therefore linked to, received by and/or inserted into the analysis device 200.

In the following, some features and aspects of the analysis device 200 are first explained in greater detail, in particular on the basis of FIG. 1. The features and aspects relating to said device are preferably also directly features and aspects of the proposed analysis system 1, in particular even without any further explicit explanation.

The analysis system 1 or analysis device 200 preferably comprises a mount or receptacle 201 for mounting and/or receiving the cartridge 100.

Preferably, the cartridge 100 is fluidically, in particular hydraulically, separated or isolated from the analysis device 200. In particular, the cartridge 100 forms a preferably independent and in particular closed or sealed fluidic or hydraulic system 103 for the sample P and the reagents and other liquids. In this way, the analysis device 200 does not come into direct contact with the sample P and can in particular be reused for another test without being disinfected and/or cleaned first.

It is however provided that the analysis device 200 can be connected or coupled mechanically, electrically, thermally and/or pneumatically to the cartridge 100.

In particular, the analysis device 200 is designed to have a mechanical effect, in particular for actuating the pump apparatus 112 and/or the valves 115A, 115B, and/or to have a thermal effect, in particular for temperature-controlling the reaction cavity/cavities 109A-C and/or the intermediate temperature-control cavity 110.

In addition, the analysis device 200 can preferably be pneumatically connected to the cartridge 100, in particular in order to actuate individual apparatus, and/or can be electrically connected to the cartridge 100, in particular in order to collect and/or transmit measured values, for example from the sensor apparatus 113 and/or sensor portions 116.

The analysis system 1 or analysis device 200 preferably comprises a pump drive 202, the pump drive 202 in particular being designed for mechanically actuating the pump apparatus 112.

Preferably, a head of the pump drive 202 can be rotated in order to rotationally axially depress the preferably bead-like raised portion of the pump apparatus 112. Particularly preferably, the pump drive 202 and pump apparatus 112 together form a pump, in particular in the manner of a hose pump or peristaltic pump and/or a metering pump, for the fluid system 103 and/or the cartridge 100.

Particularly preferably, the pump is constructed as described in German Patent DE 10 2011 015 184 B4 and corresponding U.S. Pat. No. 8,950,424. However, other structural solutions are also possible.

Preferably, the capacity and/or discharge rate of the pump can be controlled and/or the conveying direction of the pump and/or pump drive 202 can be switched. Preferably, fluid can thus be pumped forwards or backwards as desired.

The analysis system 1 or analysis device 200 preferably comprises a connection apparatus 203 for in particular electrically and/or thermally connecting the cartridge 100 and/or the sensor arrangement or sensor apparatus 113.

As shown in FIG. 1, the connection apparatus 203 preferably comprises a plurality of electrical contact elements 203A, the cartridge 100, in particular the sensor arrangement or sensor apparatus 113, preferably being electrically connected or connectable to the analysis device 200 by the contact elements 203A.

The analysis system 1 or analysis device 200 preferably comprises one or more temperature-control apparatus for temperature-controlling the cartridge 100 and/or having a thermal effect on the cartridge 100, in particular for heating and/or cooling, the temperature-control apparatus(es) (each) preferably comprising or being formed by a heating resistor or a Peltier element.

Individual temperature-control apparatus, some of these apparatus or all of these apparatus can preferably be positioned against or abutted on the cartridge 100, the main body 101, the cover 102, the sensor arrangement, sensor apparatus 113 and/or individual cavities and/or can be thermally coupled thereto and/or can be integrated therein and/or in particular can be operated or controlled electrically by the analysis device 200. In the example shown, in particular the temperature-control apparatus 204A-C are provided.

Preferably, the temperature-control apparatus, referred to in the following as the reaction temperature-control apparatus 204A, is assigned to one of the reaction cavities 109A-C or to a plurality of reaction cavities 109A-C, in particular in order for it to be possible to carry out one or more amplification reactions therein.

The reaction cavities 109A-C are preferably temperature-controlled simultaneously and/or uniformly, in particular by means of one common reaction temperature-control apparatus 204A or two reaction temperature-control apparatus 204A.

More particularly preferably, the reaction cavity/cavities 109A-C can be temperature-controlled from two different sides and/or by means of two or the reaction temperature-control apparatus 204A that are preferably arranged on opposite sides.

Alternatively, each reaction cavity 109A-C can be temperature-controlled independently and/or individually.

The temperature-control apparatus, referred to in the following as the intermediate temperature-control apparatus 204B, is preferably assigned to the intermediate temperature-control cavity 110 and/or is designed to (actively) temperature-control or heat the intermediate temperature-control cavity 110 and/or a fluid located therein, in particular the amplification products, preferably to a preheat temperature.

The intermediate temperature-control cavity 110 and/or intermediate temperature-control apparatus 204B is preferably arranged upstream of or (immediately) before the sensor arrangement or sensor apparatus 113, in particular in order for it to be possible to temperature-control or preheat, in a desired manner, fluids to be fed to the sensor arrangement or sensor apparatus 113, in particular analytes A and/or amplification products, particularly preferably immediately before said fluids are fed.

Particularly preferably, the intermediate temperature-control cavity 110 or intermediate temperature-control apparatus 204B is designed or provided to denature the sample P or analytes A and/or the amplification products produced, and/or to divide any double-stranded analytes A or amplification products into single strands and/or to counteract premature bonding or hybridizing of the amplification products, in particular by the addition of heat.

Preferably, the analysis system 1, analysis device 200 and/or the cartridge 100 and/or one or each temperature-control apparatus comprise/comprises a temperature detector and/or temperature sensor (not shown), in particular in order to make it possible to control and/or feedback control temperature.

One or more temperature sensors may for example be assigned to the sensor portions 116 and/or to individual channel portions or cavities, i.e., may be thermally coupled thereto.

The temperature-control apparatus 204C, referred to in the following as the sensor temperature-control apparatus 204C, is in particular assigned to the sensor apparatus 113 and/or is designed to (actively) temperature-control or heat fluids located in or on the sensor arrangement or sensor apparatus 113, in particular analytes A and/or amplification products, reagents or the like, in a desired manner, preferably to a hybridization temperature.

The sensor temperature-control apparatus 204C is preferably planar and/or has a contact surface which is preferably rectangular and/or corresponds to the dimensions of the sensor arrangement or sensor apparatus 113, the contact surface allowing for heat transfer between the sensor temperature-control apparatus 204C and the sensor apparatus 113.

Preferably, the analysis device 200 comprises the sensor temperature-control apparatus 204C. However, other structural solutions are also possible in which the sensor temperature-control apparatus 204C is integrated in the cartridge 100, in particular the sensor arrangement or sensor apparatus 113.

Particularly preferably, the connection apparatus 203 comprises the sensor temperature-control apparatus 204C, and/or the connection apparatus 203 together with the sensor temperature-control apparatus 204C can be linked to, in particular pressed against, the cartridge 100, in particular the sensor arrangement or sensor apparatus 113.

More particularly preferably, the connection apparatus 203 and the sensor temperature-control apparatus 204C (together) can be moved towards and/or relative to the cartridge 100, in particular the sensor arrangement or sensor apparatus 113, and/or can be positioned against said cartridge, preferably in order to both electrically and thermally couple the analysis device 200 to the cartridge 100, in particular the sensor arrangement or sensor apparatus 113 or the support thereof.

Preferably, the sensor temperature-control apparatus 204C is arranged centrally on the connection apparatus 203 or a support thereof and/or is arranged between the contact elements 203A.

In particular, the contact elements 203A are arranged in an edge region of the connection apparatus 203 or a support thereof or are arranged around the sensor temperature-control apparatus 204C, preferably such that the connection apparatus 203 is connected or connectable to the sensor apparatus 113 thermally in the center and electrically on the outside or in the edge region. However, other solutions are also possible here.

The analysis system 1 or analysis device 200 preferably comprises one or more valve actuators 205A, B for actuating the valves 115A, 115B. Particularly preferably, different (types or groups of) valve actuators 205A and 205B are provided which are assigned to the different (types or groups of) valves 115A and 115B for actuating each of said valves, respectively.

The analysis system 1 or analysis device 200 preferably comprises a control apparatus 207 for controlling the sequence of a test or assay and/or for collecting, evaluating and/or outputting or providing measured values or measurement results 713, in particular from the sensor apparatus 113, and/or test results and/or other data or values.

The control apparatus 207 preferably comprises an internal clock or time base by means of which the sequence of the test is or can be controlled and/or by means of which test steps that follow temporally one another or that extend over time are controlled or can be controlled by the control apparatus 207.

The control apparatus 207 preferably controls or is designed to control actuators of the analysis device 200 for acting on the cartridge 100 in order to carry out the test. The actuators are in particular the pump drive 202, the temperature-control apparatus 204 and/or the valve actuators 205A, B.

The analysis system 1 or analysis device 200 preferably comprises one or more sensors 206A-H. In particular, fluid sensors 206A are designed or provided to detect liquid fronts and/or flows of fluid in the fluid system 103. Particularly preferably, the fluid sensors 206A are designed to measure or detect, for example optically and/or capacitively, a liquid front and/or the presence, the speed, the mass flow rate/volume flow rate, the temperature and/or another value of a fluid in a channel and/or a cavity, in particular in a respectively assigned sensor portion 116, which is in particular formed by a planar and/or widened channel portion of the fluid system 103.

The fluid sensor 206A preferably measures a fluid entering or leaving the sensor portion 116 and/or a content change or fluid change in the sensor portion 116, and in the process generates a measurement result 706A that corresponds to the fluid entering, the fluid leaving, the content change and/or the fluid change in the sensor portion 116. This measurement result 706A from the fluid sensor 206A can be retrieved by the control apparatus 207 and/or transmitted to the control apparatus 207. The control apparatus 207 controls or is designed to control the test and/or the actuators, preferably using or taking into account the measurement result 706A from the fluid sensor 206A. In particular, when a content change, an entering fluid, a leaving fluid and/or a fluid change is detected in the sensor portion 116, in particular when a liquid front is detected, the control apparatus 207 influences a program sequence. In this case, for example a check can be carried out or a subsequent step of the test can be controlled, in particular by activating the actuators in a particular and/or differing manner.

Particularly preferably, the sensor portions 116 are each oriented and/or incorporated in the fluid system 103 and/or fluid flows against or through the sensor portions 116 such that, in the operating position of the cartridge 100, fluid flows through the sensor portions 116 in the vertical direction and/or from the bottom to the top, or vice versa, in particular in order to make it possible or easier to accurately detect liquid.

Alternatively, or additionally, the analysis device 200 preferably comprises one or more (different, other and/or further) sensors 206B.

Preferably, the other sensor 206B is or comprises a pressure sensor for determining the (relative) air pressure. The other sensor 206B can generate a measurement result 706B, which corresponds in particular to the air pressure. This measurement result 706B can be retrieved by the control apparatus 207 and/or transmitted to the control apparatus 207. The control apparatus 207 controls or is designed to control the test and/or the actuators, preferably using or taking into account the measurement result 706B from the other sensor 206B.

Alternatively, or additionally, one or more temperature sensors 206C are provided for detecting the internal temperature and/or the temperature in the interior space 212A of the analysis device 200, in particular the temperature of an atmosphere in the interior space 212A. Alternatively, or additionally, one or more temperature sensors 206C are provided for detecting the ambient temperature and/or the temperature of an atmosphere surrounding the analysis device 200 and/or the temperature of one or more of the temperature apparatus.

The temperature sensor 206C preferably measures a temperature, in particular of the interior space 212A of the analysis device 200, and in the process generates a measurement result 706C that corresponds to the temperature, in particular of the interior space 212A and/or atmosphere of or parts of the interior space 212A. This measurement result 706C from the temperature sensor 206C can be retrieved by the control apparatus 207 and/or transmitted to the control apparatus 207. The control apparatus 207 controls or is designed to control the test and/or the actuators, preferably using or taking into account the measurement result 706C from the temperature sensor 206C.

The analysis device 200 preferably comprises a tilt sensor 206D for detecting the inclination and/or orientation of the analysis device 200 and/or of the cartridge 100. The tilt sensor 206D is in particular designed and set up to determine the inclination of the analysis device 200 and/or of the cartridge 100 that differs from that in an operating position.

The tilt sensor 206D preferably measures the inclination, and in the process generates a measurement result 706D that corresponds to the inclination of the analysis device 200 and/or of the cartridge 100. This measurement result 706D from the tilt sensor 206D can be retrieved by the control apparatus 207 and/or transmitted to the control apparatus 207. The control apparatus 207 controls or is designed to control the test and/or the actuators, preferably using or taking into account the measurement result 706D from the tilt sensor 206D. In particular, if the inclination is too great, the test is prevented, blocked or interrupted, and/or an error is identified, processed, transmitted and/or signalled.

The analysis device 200 may comprise an acceleration sensor 206E. The acceleration sensor 206E is preferably designed to determine an acceleration of the analysis device 200, in particular an acceleration in the vertical and/or horizontal direction with respect to the operating position.

The acceleration sensor 206E preferably measures the acceleration, and in the process generates a measurement result 706E that corresponds to the acceleration of the analysis device 200 and/or of the cartridge 100. This measurement result 706E from the acceleration sensor 206E can be retrieved by the control apparatus 207 and/or transmitted to the control apparatus 207. The control apparatus 207 controls or is designed to control the test and/or the actuators, preferably using or taking into account the measurement result 706E from the acceleration sensor 206E. In particular, if the acceleration is too great, the test is prevented, blocked or interrupted, and/or an error is identified, processed, transmitted and/or signalled.

The analysis device 200 may comprise a humidity sensor 206F for determining the (relative) atmospheric humidity and/or the dew point of the atmosphere inside or in the interior space 212A and/or outside the analysis device 200.

The humidity sensor 206F preferably measures the (relative) atmospheric humidity and/or the dew point, and in the process generates a measurement result 706F that corresponds to the (relative) atmospheric humidity and/or the dew point of the atmosphere in the analysis device 200 and/or the surroundings of the analysis device 200. This measurement result 706F from the humidity sensor 206F can be retrieved by the control apparatus 207 and/or transmitted to the control apparatus 207. The control apparatus 207 controls or is designed to control the test and/or the actuators, preferably using or taking into account the measurement result 706F from the humidity sensor 206F. In particular, if the (relative) atmospheric humidity is too high and/or if the dew point is approached or reached, the test is prevented, blocked or interrupted, and/or an error is identified, processed, transmitted and/or signalled.

The analysis device 200 may comprise a position sensor 206G for determining the position or location, for example by means of a GPS sensor. The position sensor 206G is preferably designed to determine the location of the analysis device 200 in space, in particular on the Earth's surface, and/or to output the geographical position, the location and/or the coordinates of the analysis device 200.

The position sensor 206G preferably measures the position, in particular the geographical position, of the analysis device 200, and in the process generates a measurement result 706G that corresponds to the position or geographical position. This measurement result 706G from the position sensor 206G can be retrieved by the control apparatus 207 and/or transmitted to the control apparatus 207. The control apparatus 207 controls or is designed to control the test and/or the actuators, preferably using or taking into account the measurement result 706G from the position sensor 206G.

The analysis device 200 may comprise a cartridge sensor 206H for determining or checking the position or alignment of the cartridge 100 in or with respect to the analysis device 200. In particular, the cartridge sensor 206H is designed to detect an incorrect position of the cartridge 100 in the analysis device 200. Alternatively, or additionally, the cartridge sensor 206H is designed to detect and/or verify the correct and/or operating position of the cartridge 100 in the analysis device 200.

The cartridge sensor 206H preferably measures the position of the cartridge 100 in the analysis device 200, and in the process generates a measurement result 706H that corresponds to the position or alignment of the cartridge 100 in the analysis device 200. This measurement result 706H from the cartridge sensor 206H can be retrieved by the control apparatus 207 and/or transmitted to the control apparatus 207. The control apparatus 207 controls or is designed to control the test and/or the actuators, preferably using or taking into account the measurement result 706H from the cartridge sensor 206H. In particular, if the cartridge 100 is incorrectly positioned in the analysis device 200, the test is prevented or blocked and/or the cartridge 100 is automatically ejected from the analysis device 200 or the like. Alternatively, or additionally, the test is enabled if it is detected that the cartridge 100 is in the correct operating position in the analysis device 200.

The control apparatus 207 preferably controls or feedback controls the pump drive 202, the temperature-control apparatus 204 and/or the valve actuators 205, in particular taking into account or depending on the desired test and/or measured values from the sensor arrangement or sensor apparatus 113 and/or sensors 206A-H.

The flows of fluid are controlled in particular by accordingly activating the pump or pump apparatus 112 and actuating the valves 115A, 115B.

Particularly preferably, the pump drive 202 comprises a stepper motor, or a drive calibrated in another way, such that desired metering can be achieved, at least in principle, by means of appropriate activation.

Additionally, or alternatively, the fluid sensors 206A are used to detect liquid fronts or flows of fluid, in particular in cooperation with the assigned sensor portions 116, in order to achieve the desired fluidic sequence and the desired metering by accordingly controlling the pump or pump apparatus 112 and accordingly activating the valves 115A, 115B.

Optionally, the analysis system 1 or analysis device 200 comprises an input apparatus 208, such as a keyboard, a touch screen or the like, and/or a display apparatus 209, such as a screen.

The analysis system 1 or analysis device 200 preferably comprises at least one interface 210, for example for controlling, for communicating and/or for outputting measured data or test results and/or for linking to other devices, such as a printer, an external power supply or the like. This may in particular be a wired or wireless interface 210.

The analysis system 1 or analysis device 200 preferably comprises a power supply 211, preferably a battery or an accumulator, which is in particular integrated and/or externally connected or connectable.

Preferably, an integrated accumulator is provided as a power supply 211 and can be (re)charged by an external charging device (not shown) via a connection 211A and/or is interchangeable.

The analysis system 1 or analysis device 200 preferably comprises a housing 212, all the components and/or some or all of the apparatus preferably being integrated in the housing 212. Particularly preferably, the cartridge 100 can be inserted or slid into the housing 212, and/or can be received by the analysis device 200, through an opening 213 which can in particular be closed, such as a slot or the like.

The analysis system 1 or analysis device 200 is preferably portable or mobile. Particularly preferably, the analysis device 200 weighs less than 25 kg or 20 kg, particularly preferably less than 15 kg or 10 kg, in particular less than 9 kg or 6 kg.

The fluidic, in particular pneumatic, coupling between the cartridge 100 and the analysis device 200 will be explained in greater detail in the following, it being possible for the following aspects to be implemented independently from the preceding aspects.

As already explained, the analysis device 200 can preferably be pneumatically linked to the cartridge 100, in particular to the sensor arrangement or sensor apparatus 113 and/or to the pump apparatus 112.

Particularly preferably, the analysis device 200 is designed to supply the cartridge 100, in particular the sensor arrangement or sensor apparatus 113 and/or the pump apparatus 112, with a working medium, in particular gas or air.

Preferably, the working medium can be compressed and/or pressurized in the analysis device 200 or by means of the analysis device 200.

Preferably, the analysis device 200 comprises a pressurized gas supply 214 for this purpose, in particular a pressure generator or compressor, preferably in order to compress and/or pressurize the working medium.

The pressurized gas supply 214 is preferably integrated in the analysis device 200 or the housing 212 and/or can be controlled or feedback controlled by means of the control apparatus 207. The pressurized gas supply 214 can also, at least in part, be formed on or by the cartridge 100.

Preferably, the pressurized gas supply 214 is electrically operated or can be operated by electrical power. In particular, the pressurized gas supply 214 can be supplied with electrical power by means of the power supply 211.

The analysis device 200 or pressurized gas supply 214 is preferably designed to compress the working medium to a pressure of more than 100 kPa, particularly preferably more than 150 kPa or 250 kPa, in particular more than 300 kPa or 350 kPa, and/or of less than 1 MPa, particularly preferably less than 900 kPa or 800 kPa, in particular less than 700 kPa and/or to feed said medium to the cartridge 100 at said pressure.

Preferably, air can be drawn in, in particular from the surroundings, as the working medium by means of the analysis device 200 or pressurized gas supply 214. In particular, the analysis device 200 or pressurized gas supply 214 is designed to use the surroundings as a reservoir for the working medium or the air. However, other solutions are also possible here, in particular those in which the analysis device 200 or pressurized gas supply 214 comprises a preferably closed or delimited reservoir, such as a tank or container, comprising the working medium, and/or is connected or connectable thereto.

Preferably, the analysis device 200 or pressurized gas supply 214 comprises an inlet, the working medium in particular being able to be drawn in and/or conducted in the pressurized gas supply 214 via the inlet.

Preferably, the analysis device 200 or pressurized gas supply 214 comprises a filter, the filter preferably being integrated in the inlet and/or it preferably being possible for the working medium to be filtered by means of the filter and/or it preferably being possible for particles to be separated from the working medium by means of the filter.

The filter is preferably designed as a micro filter or as a fine particulate air filter. Preferably, particles having a particle diameter of more than 10 μm, particularly preferably more than 8 μm or 9 μm, in particular more than 6 μm or 7 μm, more particularly preferably more than 4 μm or 5 μm, can be separated by means of the filter, the particle diameter preferably being the maximum or average diameter of the respective particles. This ensures that the channels or lines in the cartridge that convey the working medium do not become contaminated or clogged and/or that no undesired pressure loss occurs.

The analysis device 200 or pressurized gas supply 214 preferably comprises a connection element 214A, in particular in order to pneumatically connect the analysis device 200 and/or pressurized gas supply 214 to the cartridge 100.

Figure 3:
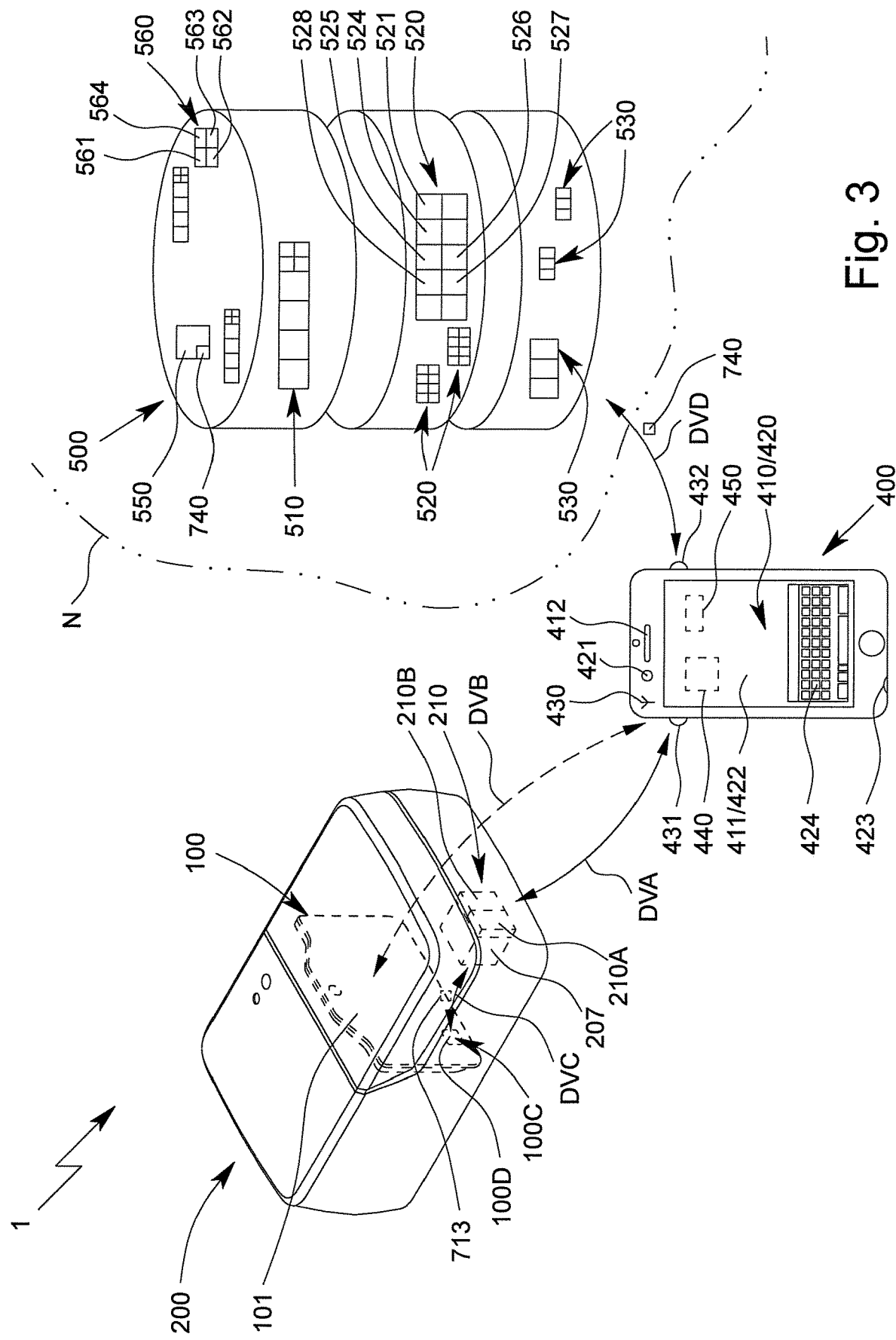
FIG. 3 is a schematic view of the analysis system.

FIG. 3 is a schematic view of the proposed analysis system 1 for testing an in particular biological sample P, comprising the analysis device 200 for receiving the cartridge 100 and subsequently carrying out the test using the received cartridge 100, and an operating instrument 400 for the analysis device 200.

The operating instrument 400 is preferably designed to control the analysis device 200. Alternatively, or additionally, the operating instrument 400 can receive or retrieve (pieces of) information, in particular (measurement) results such as measured values, from the analysis device 200. In particular, the operating instrument 400 is a mobile terminal device such as a smartphone, a tablet or the like.

The operating instrument 400 is preferably implemented or provided so as to be physically separated from the analysis device 200. The operating instrument 400 can preferably be separated and/or disconnected from the analysis device 200 physically and/or with respect to a data connection.

The operating instrument 400 can preferably be wirelessly connected to the analysis device 200. A data connection DVA can thus be established between the analysis device 200 and the operating instrument 400. However, the data connection DVA can in principle also be established in another manner, for example wired.

It is preferable for the operating instrument 400 to also be operational when separated or disconnected from the analysis device 200, in particular for carrying out evaluations or for other purposes. Alternatively, or additionally, the analysis device 200 is also operational when separated or disconnected from the operating instrument 400, in particular for continuing a test.

Particularly preferably, the operating instrument 400 comprises an interface 430 for establishing data connections DVA, DVB, DVD.

The interface 430 and/or the operating instrument 400 in particular comprises what is referred to as an analysis device interface 431 that is designed to establish the preferably wireless data connection DVA to the analysis device 200. This can, for example, be a radio interface, WPAN interface, Bluetooth interface and/or a Bluetooth module or the like.

The interface 210 of the analysis device 200 preferably corresponds to the interface 430 and/or the analysis device interface 431 of the operating instrument 400, in particular such that the data connection DVA between the operating instrument 400 and the analysis device 200 can be established. The interface 210 of the analysis device 200 and the analysis device interface 431 preferably support the same data transmission method and/or radio transmission method or radio standard, in particular WLAN or WPAN methods such as Bluetooth, NFC, Zigbee or the like.

Particularly preferably, the interface 210 of the analysis device 200 and the analysis device interface 431 make possible or facilitate what is known as an ad-hoc connection. In this case, the data connection DVA is established preferably automatically when the devices, i.e., the operating instrument 400 and the analysis device 200, are within range of one another. In other words, the operating instrument 400 and the analysis device 200 each comprise a wireless data interface 430, 210, respectively, which are designed to jointly establish an ad-hoc data connection between the operating instrument 400 and the analysis device 200, preferably such that, when the operating instrument 400 and the analysis device 200 approach one another in space, the data connection DVA therebetween is automatically established and is preferably displayed by means of the operating instrument 400.

The data connection DVA is preferably a point-to-point connection. The data connection DVA connects the analysis device 200 to the operating instrument 400 preferably directly and/or without any interposed networks. It is possible for the operating instrument 400 to establish data connections DVA to different analysis devices 200 simultaneously or in succession. Alternatively, or additionally, it is possible for one analysis device 200 to establish data connections DVA to a plurality of operating instruments 400 simultaneously or in succession.

In order to control the test, it is preferable for precisely one data connection DVA to be provided between the analysis device 200 to be controlled and the operating instrument 400 controlling the analysis device 200, and/or for a piece or pieces of control information 510 to be received and/or accepted or to be acceptable and/or receivable and/or for measurement results 713 to be transmitted or to be transmittable only via precisely one data connection DVA between the analysis device 200 to be controlled and the operating instrument 400 controlling the analysis device 200.

The analysis device 200 preferably comprises a receiver 210A for, preferably wirelessly, receiving the piece/pieces of control information 510 from the operating instrument 400. Preferably, the interface 210 comprises the receiver 210A, via which signals, in particular pieces of control information 510, are or can be received from the operating instrument 400.

Alternatively, or additionally, the analysis device 200 and/or the interface 210 comprises a transmitter 210B, via which data, in particular results such as measurement results 713 from the sensor apparatus 113, are or can be sent, particularly preferably to the operating instrument 400.

The interfaces 210, 431 preferably correspond to one another such that they support the same data transmission standard and/or radio standard, in particular Bluetooth, WLAN or the like. These interfaces are particularly preferably interfaces 210, 431 which make possible what is known as an ad-hoc connection, the data connection DVA preferably being established automatically when the devices, i.e., the operating instrument 400 and the analysis device 200, are within range of one another.

The analysis system 1 preferably further comprises a database 500 or the database 500 is assigned to the analysis system 1. The database 500 is preferably an external database 500 that is implemented or provided so as to be physically separated from the operating instrument 400 and/or from the analysis device 200. In principle, however, it is not impossible for the database 500 to be provided or implemented such that it can be directly linked, in particular to the operating instrument 400, or to be provided or implemented by the operating instrument 400.

The operating instrument 400 can access the database 500 via a data connection DVD. For this purpose, the operating instrument 400 and/or the interface 430 can comprise a database interface 432 by means of which the database 500 can be accessed, in particular via a network N. The network N may be the Internet or another data network. It is also preferable for the operating instrument 400 to be able to establish the data connection DVD to the database 500 via a wireless interface, in particular WLAN, WPAN, mobile communications or the like. However, in principle, other solutions are also possible here.

Particularly preferably, the operating instrument 400 comprises different interfaces 430 that are independent of one another for establishing data connections DVA, DVD to the analysis device 200 and to the database 500, the analysis device 200 (as a peripheral device of the operating instrument 400) being designed to communicate exclusively with or via the operating instrument 400.

The analysis system 1, in particular the database 500, preferably comprises pieces of control information 510 by means of which the analysis device 200 can be controlled in order to carry out a test.

The pieces of control information 510 preferably define the actuation of the actuators of the analysis device 200 in a particular manner, such that the sample P is tested in the cartridge 100. In particular, actuators for carrying out the test can be or are controlled using a piece or pieces of control information 510 such that said actuators act on the cartridge 100 and/or the sample P. These actuators are in particular the pump drive 202 and/or one or more temperature-control apparatus 204 and/or one or more valve actuators 205. The piece/pieces of control information 510 preferably comprises/comprise parameters and/or instructions for carrying out one or more steps of the method for testing the sample P explained above.

Preferably, the analysis system 1 comprises pieces calibration information 520 that can be stored in the database 500 and/or can be retrieved from the database 500. The pieces of calibration information 520 are preferably capable of influencing the test of the sample P, in particular depending on the specific cartridge 100, on a cartridge batch of the specific cartridge 100 and/or on the specific test.

The pieces of calibration information 520 are in particular default or basic settings, parameters and/or threshold values for sensors such as the sensor apparatus 113 of the cartridge 100, for one or more of the sensor(s) 206A-H of the analysis device 200 and/or for one or more of the actuators.

Pieces of calibration information 520 can be used in addition to pieces of control information 510 for carrying out the test, the pieces of calibration information 520 preferably influencing or specifying the pieces of control information 510. The pieces of calibration information 520 can be or can form the pieces of control information 510 or a part of the pieces of control information, even if this is not explicitly mentioned in the following.

The analysis device 200 can be calibrated and/or configured by pieces of calibration information 520 that can form part of the pieces of control information 510 or can be provided separately. For this purpose, the pieces of calibration information 520 can be determined, retrieved and/or transmitted to the analysis device 200 by means of the operating instrument 400.

In one example, pieces of fluid sensor calibration information 521 are provided which influences setting and/or evaluation of the fluid sensor 206A. The pieces of fluid sensor calibration information 521 are preferably dependent on the test to be carried out, the phase of the test and/or expected effects of a content change in a sensor portion 116 during the test sequence, and/or contain various specifications which are dependent thereon.

Alternatively, or additionally, pieces of tilt sensor calibration information 524 can be provided, preferably comprising one or more threshold values 525, in particular a start threshold value 526 for blocking the start of a test if said threshold value is exceeded, and/or an interruption threshold value 527 for interrupting the test and/or for processing errors if said threshold is exceeded.

Alternatively, or additionally, pieces of sensor arrangement calibration information 528 can be provided, by means of which properties of the sensor arrangement 113 or sensor apparatus 113 are or can be set. In particular, it is provided that the pieces of sensor arrangement calibration information 528 are transmitted or can be transmitted to the sensor arrangement 113 or sensor apparatus 113 by the analysis device 200, and that the sensor arrangement 113 or sensor apparatus 113 carries out or is designed to carry out a measurement taking into account the pieces of sensor arrangement calibration information 528.

The proposed analysis system 1 preferably comprises pieces of evaluation information 530 which are stored in the database 500 and/or are retrievable or can be retrieved from the database 500. The pieces of evaluation information 530 are preferably designed to be able to interpret measurement results 713 that originate from the cartridge 100, in particular from the sensor apparatus 113.

The pieces of control information 510 and/or evaluation information 530 particularly preferably comprise instructions, preferably in the form of an algorithm and/or for controlling a process on or using a processor or controller. The instructions preferably form a module that can be or is implemented by the analysis device 200 and/or the operating instrument 400, as a result of which the behavior of the analysis device 200 and/or the operating instrument 400 can be or is changed.

The instructions are in particular commands, machine code, pre-compiled source code or source code. The instructions preferably form a module-like software component, in particular a plugin. The instructions can be designed to form and/or to replace a module of the operating instrument 400 and/or of the analysis device 200. For this purpose, the pieces of control information 510 and/or the pieces of evaluation information 530 can comprise a (software) interface for coupling or implementation by the control apparatus 207 and/or an evaluation module 440 of the operating instrument 400.

The piece/pieces of control information 510 particularly preferably comprises/comprise or forms/form a module of the control apparatus 207 that can be exchanged, preferably in terms of software. This module preferably contains instructions such as logic commands, loops and the like for controlling the test, in particular in the form of a computer program or computer program product to be executed by the analysis device 200 and/or the control apparatus 207. The piece/pieces of control information 510 can be or form, in particular as a plugin, an exchangeable part of the control apparatus 207.

An evaluation module 440 is preferably formed by the operating instrument 400 or the operating instrument 400 comprises the evaluation module 440. By means of the evaluation module 440, measurement results 713 read out from the sensor apparatus 113 are evaluated preferably using the piece/pieces of evaluation information 530 retrieved from the database 500 and/or the evaluation module 440 is designed for this purpose.

The piece/pieces of evaluation information 530 particularly preferably comprises/comprise or forms/form a module of the evaluation apparatus 440 that can be exchanged, preferably in terms of software. This module preferably contains instructions such as logic commands, loops and the like for controlling the evaluation of measurement results 713, in particular in the form of a computer program or computer program product to be executed by the operating instrument 400 and/or the evaluation module 440. The piece/pieces of evaluation information 530 can be or form, in particular as a plugin, an exchangeable part of the evaluation module 440.

Alternatively, or additionally, the instructions can comprise parameters for configuring the control apparatus 207 and/or the evaluation module 440. These parameters are preferably provided in addition to the instructions, for example for the analysis device 200, in the form of or comprising the pieces of calibration information 520. Alternatively, the pieces of control information 510 and/or pieces of evaluation information 530 can however also merely comprise parameters and/or other information for the control and/or evaluation.

The database 500 preferably comprises a results memory 550 in which results can be stored and/or saved.

Within the meaning of the present invention, the term "database" should preferably be understood in a broad sense and also incorporates multi-part databases in particular. Therefore, in principle, the database 500 can be provided in different physical units or at different locations and/or can be composed of a plurality of sub-databases.

The operating instrument 400 can preferably be separated or disconnected from the analysis device 200 with respect to a data connection and/or physically. For this purpose, the analysis device 200 can initially be connected to the operating instrument 400 with respect to a data connection by the data connection DVA being established.

In order to control the test and/or the analysis device 200, the operating instrument 400 can retrieve pieces of control information 510 from the database 500 and transmit said pieces of information to the analysis device 200 in unaltered or altered form.

The operating instrument 400 is preferably designed to evaluate measurement results 713 which can preferably be generated by the sensor apparatus 113 of the cartridge 100 while the sample P is being tested. For this purpose, it is provided that measurement results 713 which can originate from a sensor apparatus 113 of the cartridge 100 and/or which can be transmitted from the analysis device 200 to the operating instrument 400, are or can be evaluated in the operating instrument 400. For this purpose, the operating instrument 400 can retrieve or receive the pieces of evaluation information 530 from the database 500 and, using this pieces of evaluation information 530, evaluate the measurement results 713, in particular in the evaluation module 440 of the operating instrument 400.

The operating instrument 400 preferably comprises a memory 450. The memory 450 can be used to store, at least temporarily, pieces of control information 510, calibration information 520 and/or evaluation information 530, or the operating instrument 400 and the memory 450 can be designed for this purpose. Alternatively, or additionally, evaluation results 740, that have been or can be generated from the measurement results 713 by means of the operating instrument 400, can be stored in the memory 450.

In one example, the operating instrument 400 comprises an output apparatus 410, preferably an in particular touch-sensitive screen or display 411 and/or a speaker 412. Alternatively, or additionally, the operating instrument 400 comprises an input apparatus 420, in particular a camera 421, a touchpad 422, a microphone 423 and/or a keyboard 424.

The operating instrument 400 is preferably designed to display an operating interface or a user interface via the output apparatus 410, in particular the screen or display 411, or to provide in another way operating elements for controlling the test and/or the analysis device 200, and/or to output a status or other (pieces of) information relating to the test. Alternatively, or additionally, commands can be received via the input apparatus 420, by means of which the operating instrument 400 starts, configures and/or controls the test of the sample P in a manner corresponding to the commands.

Preferably, the transmission of commands and/or (pieces of) information to the analysis device 200 is triggered via the input apparatus 420 or can be triggered by the input apparatus 420.

In particular, transmission of the piece/pieces of control information 510 from the operating instrument 400 to the analysis device 200 can be initiated or controlled via the input apparatus 420. Alternatively, or additionally, the analysis device 200 can be controlled in order to receive the cartridge 100 and/or to start the test, preferably using the piece/pieces of control information 510 and/or a command received via the input apparatus 420. The operating instrument 400 is therefore preferably designed to transmit to the analysis device 200 pieces of control information 510 for receiving or ejecting the cartridge 100. In this case, a cartridge 100 can in particular be inserted only when the operating instrument 400 is connected to the analysis device 200, whereupon the operating instrument 400 can verify the cartridge 100 and can eject said cartridge or block a test if an error, such as incompatibility, is detected.

Alternatively, or additionally, the operating instrument 400 is designed to transmit pieces of control information 510 for starting the test to the analysis device 200. The test is thus preferably started only by a command originating from the operating instrument 400. The analysis device 200 itself preferably does not comprise a user interface for generating a start command or for causing the test to start. This task is preferably reserved for the operating instrument 400.

The cartridge 100 preferably comprises at least one cartridge identifier 100C which corresponds to the cartridge 100 and/or to a batch with which the cartridge 100 is associated.

The cartridge identifier 100C is in particular a piece of information that is specific to the relevant cartridge 100, is in particular unique and/or is designed to uniquely identify the cartridge 100, such as an identification code which is assigned to the relevant cartridge 100 and makes it possible for said cartridge to be identified in a preferably unique manner.

Alternatively, or additionally, the cartridge identifier 100C makes it possible to assign the cartridge 100 to a production cycle and/or to a batch of particular cartridges 100. A batch is preferably characterized in that cartridges 100 are produced in the same continuous production cycle and/or are produced having the same components, in particular having the same sensor apparatus 113 and/or the same reagents and the like. There is preferably a plurality of batches which can differ from one another with regard to production periods, batches of starting materials used and the like, for example.

The cartridge identifier 100C can be stored and/or saved in a memory means 100D of the cartridge 100. The memory means 100D can be a barcode 124, an NFC tag and/or a memory which is provided in the sensor apparatus 113, is connected to the sensor apparatus 113 or is assigned to the sensor apparatus 113, or another apparatus for storing code or the like.

The cartridge identifiers 100C are preferably assigned to the respective cartridges 100. In particular, the cartridge identifier 100C is formed by the cartridge 100, connected thereto and/or arranged thereon.

The analysis system 1 can comprise one or a plurality of cartridges 100 which can each preferably be distinguished from one another by means of at least one cartridge identifier 100C and/or which are assigned to a batch.

The same cartridge 100 can comprise at least two cartridge identifiers 100C that each correspond to the cartridge 100. The cartridge identifiers 100C can preferably be read out by different read-out methods, in particular optically, by radio, by a wired connection or the like.

The respective cartridges 100 can comprise two different memory means 100D having the same or corresponding cartridge identifiers 100C. The memory means 100D are preferably independent of one another and/or separated from one another physically. The memory means 100D can preferably be read out in different ways, in particular electronically and/or by an electronic connection on the one hand, and wirelessly, in particular optically and/or by radio on the other hand.

In the example shown, corresponding cartridge identifiers 100C are stored, saved or recorded both in a memory that can be read out electronically, in particular of the sensor apparatus 113, and in a memory that can be read out wirelessly, by radio or optically, in particular the barcode 124. This makes it possible for the cartridge identifier 100C or cartridge identifiers 100C corresponding to the same cartridge 100 to be read out in different ways.

This advantageously makes it possible to retrieve pieces of control information 510, calibration information 520 and/or evaluation information 530 from the database 500 independently, disconnected or separately from the analysis device 200, preferably by optically reading out the cartridge identifier 100C from the cartridge 100. Alternatively, or additionally, a memory means 100D of the cartridge 100 that can be read out electronically makes it possible for the cartridge identifier 100C to be read out without there being an optical connection to or visual contact with the cartridge 100, for example when said cartridge is inserted into the analysis device 200.

The at least two cartridge identifiers 100C can be the same or, in one aspect of the present invention, which can also be implemented independently, said cartridge identifiers 100C can be different. In particular, it is possible and preferable for a (first) cartridge identifier 100C to be individual or unique to the cartridge 100, i.e., designed to uniquely identify the cartridge 100. A (different or second) cartridge identifier 100C is preferably designed to assign the cartridge 100 to a batch of cartridges 100. The at least two cartridge identifiers 100C preferably correspond to one another. In particular, the cartridge identifier 100C corresponding to the batch and/or the batch can be identified using the cartridge identifier 100C that uniquely identifies the cartridge 100. Preferably, both cartridge identifiers 100 are read out and used, in particular in order to determine and/or retrieve pieces of control information 510 and/or evaluation information 530 on the one hand and in order to verify said pieces of information on the other hand.

The respective cartridges 100 are preferably identified at least twice or a cartridge identifier 100C is read out and used at least twice, namely preferably once directly by the operating instrument 400 in order to retrieve pieces of control information 510 and/or calibration information 520 and/or evaluation information 530 and a second time by means of or via the analysis device 200 in order to ensure that the test is carried out using pieces of control information 510, calibration information 520 and/or evaluation information 530 that corresponds to the cartridge 100 and/or in order to ensure and/or verify that the pieces of control information 510, calibration information 520 and/or evaluation information 530 corresponds to the cartridge 100.

The proposed analysis system 1 preferably supports a plurality of different tests. As a first option, it may be provided that the analysis system 1 supports different cartridges 100, the cartridges 100 each being designed to carry out one of the tests, and the tests being different. Alternatively, or additionally, the same cartridge 100 may, or may be able to, carry out different tests.

Different tests differ in particular in that the sample P is differently conveyed and/or treated within the cartridge 100. In a cartridge 100 that supports different tests, for this purpose the sample P can be transported on different paths and/or in different directions within the fluid system 103 of the cartridge 100.

Alternatively, or additionally, different preparation steps or treatments of the sample P that are supports by the cartridge 100 are carried out. The cartridge 100 preferably comprises (just) one sensor apparatus for generating measurement results corresponding to the sample P. In principle, however, a plurality of different sensor apparatus 113 may also be provided on the same cartridge 100 for the different tests.

If different cartridges 100 are provided or used for the different tests, the sample P is preferably likewise conveyed and/or treated in different manners within these different cartridges 100. Here, different conveying paths, conveying directions and/or treatments may necessarily result due to the construction of the cartridges 100.

Alternatively, or additionally, different cartridges 100 may in principle be constructed identically or similarly, the different cartridges 100 being designed for different tests by different reagents, wash buffers or the like being made available and/or by different sensor apparatus 113 being provided. In particular, the same main body 101 of the cartridge 100 may be used, and the cartridges 100 may be designed for and/or specific to different tests by using other reagents or methods for processing and/or conveying the sample P, and/or in another manner.

One piece of control information 510 preferably corresponds to each test. In order to carry out the different tests, different pieces of control information 510 are therefore provided in order to convey and/or treat the sample P in a different manner that is specific to the test in question. As already explained above, the pieces of control information 510 are designed in this case to control actuators of the analysis device 200 such that the actuators act on the cartridge 100 such that the analysis is carried out, i.e., in particular that the sample P is conveyed and/or treated, particularly preferably exclusively within the cartridge 100.

The pieces of control information 510 are preferably designed such that the actuators of the analysis device 200 transport the sample P in the cartridge 100 to the sensor apparatus 113, where the sample P is then analyzed by the sensor apparatus 113 and measurement results 713 corresponding to the sample P and/or to properties of the sample P are produced or determined using the sensor apparatus 113.

The pieces of control information 510 corresponding to the different tests are preferably stored in the database 500 and/or can be retrieved from the database 500. Alternatively, or additionally, pieces of control information 510 corresponding to different tests can also be stored in the operating instrument 400, in particular stored temporarily in the memory 450.

Preferably, if required, the pieces of control information 510 that correspond to the cartridge 100 inserted into the analysis device 200 and/or to the test to be carried out are transmitted to the analysis device 200 by the operating instrument 400.

Preferably, the analysis device 200 only comprises pieces of control information 510 for carrying out exactly one test at any one time. Alternatively, or additionally, however, it is also possible for the analysis device 200 to temporarily store and, in particular depending on the inserted cartridge 100 and/or the selected test, to select, preferably automatically, different pieces of control information 510 corresponding to different tests, and for the test to be carried out using this pieces of control information 510.

In one aspect of the present invention, which can also be implemented independently, one of a plurality of pieces of control information 510 that correspond to different tests is selected for carrying out the test using the cartridge 100, and/or a piece of control information 510 of this type can be selected, particularly preferably using the operating instrument 400.

Different pieces of control information 510 are preferably different sets, units and/or sequences of instructions, data and/or parameters that are each suitable for controlling a (complete) test and/or that each correspond to a (complete) test.

Different pieces of control information 510 can preferably be differentiated from one another. In particular, the different pieces of control information 510 are each in the form of a file or another data structure.

In one aspect of the present invention, which can also be implemented independently, measurement results 713 are determined by the sensor apparatus 113 of the cartridge 100 by means of the test. Furthermore, at least two different pieces of evaluation information 530 are preferably provided for carrying out different evaluations of the measurement results 713. At least one piece of the evaluation information 530 is selected and/or used for evaluating the measurement results 713 determined by the test on the sample P.

Using the different pieces of evaluation information 530, the measurement results 713 that come from the same test can thus be evaluated in different manners, meaning that different evaluation results 740 are or can be generated.

The evaluation is preferably carried out by the operating instrument 400. For this purpose, the operating instrument 400 can receive the measurement results 713 from the analysis device 200 and can process said results using the pieces of evaluation information 530, in order to generate, to output, to display and/or to store the evaluation result(s) 740, in particular in the database 500, in this case particularly preferably in the results memory 550.

Particularly preferably, from the plurality of pieces of evaluation information 530 that correspond to or are suitable for different evaluations of the same measurement results 713, one piece of the evaluation information 530 that corresponds to one of the different evaluations of the measurement results 713 is selected and/or is used to evaluate the measurement results 713.

In particular, the selected piece of evaluation information 530 is used by the operating instrument 400 to evaluate the measurement results 713. For this purpose, the operating instrument 400 may comprise an evaluation module 440 which receives the measurement results 713 as input values, processes the measurement results 713 using the selected piece(s) of evaluation information 530, and generates the evaluation result 740 thereby.

Different pieces of evaluation information 530 are preferably different sets, units and/or sequences of instructions, data and/or parameters that are each suitable for carrying out an evaluation and/or that each correspond to an evaluation. Different pieces of evaluation information 530 can preferably be differentiated from one another. In particular, the different pieces of evaluation information 530 are each in the form of a file or another data structure.

Selecting certain pieces of a plurality of different pieces of control information 510 and/or evaluation information 530 provides the advantage of a particularly universally applicable and/or configurable analysis system 1.

Preferably, different pieces of control information 510 are stored, preferably in the database 500, for the same cartridge 100. Here, preferably only certain pieces of control information 510 can be and/or are retrieved or selected for retrieval and/or only control using these certain pieces of control information 510 can be and/or is retrieved or selected and/or evaluation using these certain pieces of evaluation information 530 can be and/or is retrieved or selected, preferably provided that the certain pieces of control information 510 correspond to the cartridge 100 and/or are compatible with the cartridge 100 and/or are enabled and/or blocked for the cartridge 100.

Other pieces of control information 510 are preferably prevented from being retrieved and/or the control using the other pieces of control information 510 is preferably prevented, in particular provided that the other pieces of control information 510 do not correspond to the cartridge 100 and/or are not compatible with the cartridge 100 and/or are blocked and/or are not enabled for the cartridge 100.

Preferably, different pieces of evaluation information 530 are stored, preferably in the database 500, for the same cartridge 100. Furthermore, preferably only certain pieces of evaluation information 530 are enabled and/or unblocked for retrieval and/or can be selected. The evaluation of the measurement results 713 from the test, which test can be carried out using the cartridge 100, is preferably only enabled, unblocked or possible using these certain pieces of evaluation information 530. The certain pieces of evaluation information 530 preferably correspond to the cartridge 100. Alternatively, or additionally, the certain pieces of evaluation information 530 are suitable for evaluating measurement results 713 that can be determined by the test using the cartridge 100. Alternatively, or additionally, the certain pieces of evaluation information 530 are enabled and/or unblocked for the cartridge 100. Alternatively, or additionally, other pieces of evaluation information 530 are prevented or blocked from being retrieved and/or the evaluation using the other pieces of evaluation information 530 is prevented or blocked and/or other pieces of evaluation information 530 are prevented or blocked from being selected, the other pieces of evaluation information 530 preferably not corresponding to the cartridge 100 and/or not being compatible with the cartridge 100 and/or being blocked and/or not being enabled for the cartridge 100.

The pieces of control information 510 and/or evaluation information 530 that correspond to, are supported by or compatible with a specific cartridge 100 or a cartridge identifier 100C corresponding thereto can preferably be selected or enabled for selection. Tests or pieces of control information 510 corresponding thereto that are not supported by a specific cartridge 100 are blocked and/or prevented in this case on the basis of the cartridge identifier 100C. The same applies to evaluations or pieces of evaluation information 530 corresponding thereto in that they are blocked and/or prevented if they are incompatible with the cartridge 100 and/or cartridge identifier 100C.

In principle, pieces of control information 510 and/or evaluation information 530 can alternatively or additionally be blocked or enabled for reasons other than compatibility. In particular, pieces of control information 510 and/or evaluation information 530 corresponding to the cartridge 100 and/or cartridge identifier 100C can also be blocked even if, in principle, a test using the cartridge 100 corresponding to the cartridge identifier 100C is possible and/or an evaluation of measurement results 713 using said cartridge 100 is possible. In this case, pieces of control information 510 and/or evaluation information 530 that are generally blocked preferably are or can be enabled or unblocked on the basis of the group affiliation of a user or operating instrument 400 and/or as a result of obtaining permission.

In a particularly preferred embodiment, first pieces of the different pieces of control information 510 correspond to a protein assay and second pieces of the different pieces of control information 510 correspond to a nucleic-acid assay, the analysis device 200 preferably being controlled or controllable using the pieces of control information 510 such that both the protein assay and the nucleic-acid assay can be or are carried out by the same cartridge 100 using the different pieces of control information 510.

In a particularly preferred embodiment, first pieces of the different pieces of evaluation information 530 correspond to a protein assay and second pieces of the different pieces of evaluation information correspond to a nucleic-acid assay, the measurement results 713 from the test preferably being evaluated using the pieces of evaluation information 530 such that both the protein assay and the nucleic-acid assay and/or the measurement results 713 therefrom, which preferably have been obtained using the same cartridge 100, can be analyzed using the different pieces of evaluation information 530, in particular such that the presence of certain amino-acid sequences, proteins and/or diseases is determined and/or output.

Figure 4:
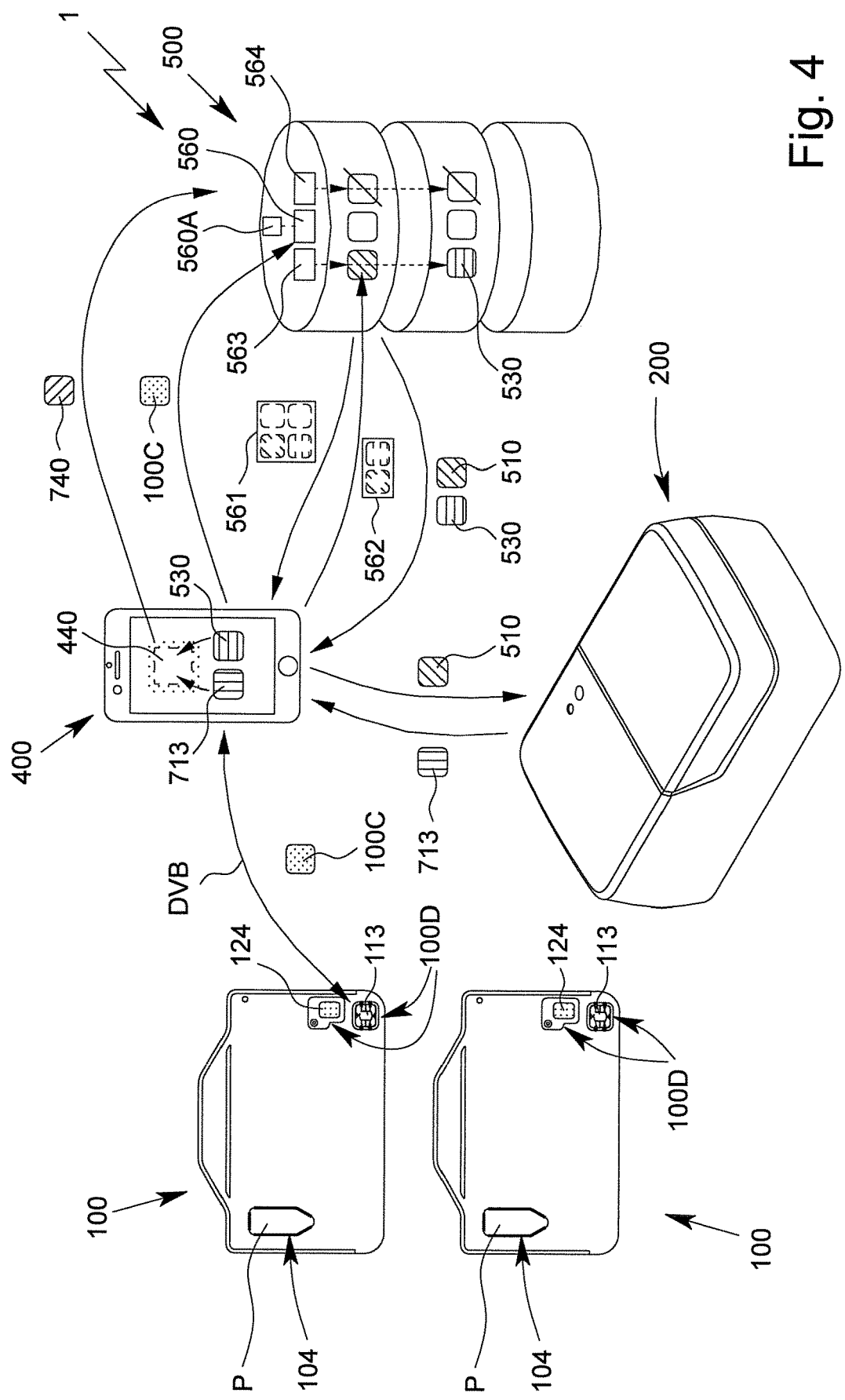
FIG. 4 shows a schematic sequence using the analysis system.

FIG. 4 shows a schematic sequence using the proposed analysis system 1. On the basis of the schematic sequence according to FIG. 4, the proposed selection processes are explained in greater detail in the following.

The pieces of control information 510 and the pieces of evaluation information 530 can in principle be selected in the same manner, in similar manners, separately, but also together. Furthermore, the pieces of control information 510 may be or comprise the pieces of calibration information 520. Owing to the sequences preferably being substantially identical or similar, the aspects of the invention relating thereto are explained together. It is clear that said sequences can also be provided, implemented and carried out separately, individually and independently from one another.

The analysis system 1 in FIG. 4 comprises a plurality of cartridges 100 for carrying out different tests or comprises one cartridge 100 designed for carrying out different tests. The analysis system 1 can therefore support different tests by different cartridges 100 being used that each support one test, with the tests being different from one another. Alternatively, or additionally, the analysis system 1 comprises one or more cartridges 100 that each support a plurality of tests. As previously explained, the different tests may be protein assays, nucleic-acid assays or the like.

The cartridges 100 preferably each comprise at least one memory means 100D, in which a cartridge identifier 100C is stored. For further details in this regard, reference is additionally made to the explanations given in conjunction with FIG. 3.

In the example shown, the cartridge 100 or all the cartridges 100 comprises/comprise two memory means 100D that are independent from one another. One of the memory means 100D is in the form of an electronically readable memory, flash memory or the like as part of the sensor arrangement or sensor apparatus 113, or is provided so as to be assigned to the sensor arrangement or sensor apparatus 113. An additional memory means 100D is provided in the form of the barcode 124 or another, wirelessly readable memory means 100D.

The memory means 100D may preferably be read out using different methods, and in the example shown they are read out wirelessly/optically and in a wired manner/electronically. However, in principle, other solutions are also possible here.

The cartridge identifier 100C corresponding to the cartridge 100 or cartridges 100 is preferably received by the operating instrument 400. In particular, the operating instrument 400 can scan the barcode 124 using the camera 421 for this purpose, in particular using the data connection DVB, which represents optical data transmission in this case. Alternatively, or additionally, the analysis device 200 can read out the cartridge identifier 100C electronically from the memory means 100D of the cartridge 100, in particular via the data connection DVC as shown in FIG. 3, and can transmit said identifier 100C to the operating instrument 400, in particular via the data connection DVA. In principle, however, the cartridge identifier 100C may also be determined or established in another manner.

Preferably, the different pieces of control information 510 and/or evaluation information 530 that correspond to the cartridge identifier 100C are identified by means of the cartridge identifier 100C. Thus, in particular, pieces of control information 510 and/or evaluation information 530 of such type are identified that correspond to a test supported by the cartridge 100 and/or to the evaluation of measurement results 713 from a test of this type. This is particularly preferably carried out by or in the operating instrument 400 and/or by or in the database 500.

In the example shown, the operating instrument 400 transmits the cartridge identifier 100C to the database 500. The database 500 preferably comprises an identification module 560, by means of which pieces of control information 510 and/or evaluation information 530 corresponding to the cartridge identifier 100C is or can be identified. For this purpose, the database 500 may comprise pieces of identification information 560A. The pieces of identification information 560A preferably provide an allocation or assignment of the cartridge identifier 100C to the pieces of control information 510 and/or evaluation information 530 corresponding to the cartridge identifier 100C.

Preferably, pieces of control information 510 for the test are enabled for or prevented from being retrieved and/or used depending on the cartridge identifier 100C. Alternatively, or additionally, pieces of evaluation information 530 for use in the evaluation of measurement results 713 from the test are enabled for or prevented from being retrieved or used.

Preferably, for this purpose, the analysis system 1, in particular the database 500, is designed to block or disable certain pieces of control information 510 and/or evaluation information 530 and to enable or unblock other pieces of control information 510 and/or evaluation information 530. In particular, the identification module 560 is designed to identify and enable or unblock pieces of control information 510 and/or evaluation information 530 corresponding to the cartridge 100 or cartridge identifier 100C in question by means of the pieces of identification information 560A. Alternatively, or additionally, the identification module 560 is designed to block or disable pieces of control information 510 and/or evaluation information 530 that has not been enabled and/or does not correspond to the cartridge 100 or cartridge identifier 100C. These functions may in principle also be assumed or carried out by the operating instrument 400.

Pieces of control information 510 and/or evaluation information 530, preferably corresponding to the cartridge 100 or cartridge identifier 100C, may be enabled or unblocked in particular by a booking apparatus or a shop system (not shown).

Pieces of control information 510 and/or evaluation information 530 that have been enabled or have not been blocked can preferably be selected.

The database 500 may comprise an enabling module 563, which, preferably controlled by the identification module 560, can enable or unblock pieces of control information 510 and/or evaluation information 530. The database may further comprise a blocking module 564, which, preferably controlled by the identification module 560, can disable or block pieces of control information 510 and/or evaluation information 530.

In order to select preferably enabled or unblocked pieces of control information 510 and/or evaluation information 530, pieces of control information 510 and/or evaluation information 530, which are in particular enabled, or corresponding pieces of option information 561 for identifying enabled pieces of control information 510 and/or evaluation information 530 are preferably transmitted to the operating instrument 400, as shown in FIG. 4 by the arrow.

One piece of the control information 510 and/or one or more pieces of the evaluation information 530 and/or one or more pieces of the option information 561 can then be selected using the operating instrument 400. In particular, graphical representations of the pieces of control information 510 and/or evaluation information 530 or the pieces of option information 561 corresponding thereto are displayed and can be selected, in particular by means of the input apparatus 420, such as a touch screen.

If the pieces of control information 510 and/or evaluation information 530 have already been transmitted to the operating instrument 400 and/or stored by the operating instrument 400, the selected piece of control information 510 can subsequently be transmitted to the analysis device 200.

Alternatively, pieces of selection information 562 are transmitted from the operating instrument 400 to the database 500, as indicated by the arrow in the example shown in FIG. 4. On the basis of the pieces of selection information 562 that correspond to the selection made by the operating instrument 400, the database 500 can determine selected pieces of control information 510 and/or evaluation information 530 and transmit said pieces of information to the operating instrument 400, as indicated by the arrow in FIG. 4. In this case too, the operating instrument 400 preferably transmits the selected piece/pieces of control information 510 to the analysis device 200.

The analysis device 200 preferably carries out the test on the basis of the transmitted piece/pieces of control information 510.

The analysis device 200 is preferably controlled using the selected piece(s) of control information 510, and therefore the sample P is conveyed within the cartridge 100 in the manner that is specific to the test corresponding to the selected piece(s) of control information 510. Alternatively, or additionally, one or more tests supported by the cartridge 100, in particular a molecular assay and/or a protein assay, are controlled using the selected pieces of control information 510. Here, the analysis device 200 can be controlled using the different pieces of control information 510 in order to carry out different tests on the sample P, which can also be carried out separately.

The analysis device 200 then returns to the operating instrument 400 measurement results 713 that have been generated by means of the test. For this purpose, the measurement results 713 can be transmitted to the operating instrument 400 and/or can be retrieved by the operating instrument 400.

The measurement results 713 are preferably received by the operating instrument 400 and are evaluated by means of the preferably selected piece/pieces of evaluation information 530. The evaluation is preferably carried out by or in the operating instrument 400, but can in principle also be carried out at another point. Particularly preferably, the evaluation is carried out so as to generate evaluation results 740 and/or is carried out outside the analysis device 200.

Particularly preferably, measurement results 713 from the same test on the sample P carried out using the cartridge 100 are evaluated using different pieces of evaluation information 530 or the analysis system 1 is designed for this purpose. Alternatively, or additionally, measurement results 713 from different tests on the sample P carried out using the same cartridge 100 are evaluated using the different pieces of evaluation information 530 or the analysis system 1 is designed for this purpose.

Optionally, the evaluation results 740 can be stored in the database 500, in particular can be saved in the results memory 550. For this purpose, as indicated by an arrow in the example shown, it is in particular provided that the evaluation results 740 are sent to the database 500 by the operating instrument 400. However, other solutions are also conceivable here.

Another aspect of the present invention, which can also be implemented independently, relates to a computer program product comprising program code means which, when executed, cause the steps of the method to be carried out. The computer program product may comprise components which are and/or can be executed on the operating instrument 400 and/or the database 500, in particular in order to facilitate or implement the selection process according to the proposed method. The computer program product can be stored in the memory 450 of the operating instrument 400 in full or in part. The computer program product preferably is a non-transitory computer-readable media.

Another aspect of the present invention, which can also be implemented independently, relates to the analysis system 1 for testing an in particular biological sample P, which is preferably designed to carry out the method.

Here, it is provided in one aspect that the analysis device 200 and/or the cartridge 100 support different tests on the sample P, which can also be carried out separately, and for which the sample P is conveyed and/or treated within the cartridge 100 in different manners specific to the respective tests. Furthermore, at least two pieces of Control information 510 are provided that correspond to the different tests, it being possible to select at least one piece or certain pieces of the control information 510 for carrying out the test using the cartridge 100, and it being possible to control the analysis device 200 using the selected piece(s) of control information 510 such that the sample P is conveyed and/or treated within the cartridge 100 in the manner specific to the test corresponding to the selected piece(s) of control information 510.

Alternatively, or additionally, it is provided that measurement results 713 can be determined by the test by means of the sensor apparatus 113 of the cartridge 100. Furthermore, at least two different pieces of evaluation information 530 are provided for carrying out different evaluations of the measurement results 713, and at least one piece or certain pieces of the evaluation information 530 can be selected for the evaluation of the measurement results 713 determined by the test on the sample P.

Furthermore, it is preferable for the different pieces of control information 510 to be designed to control different tests on the sample P, which can preferably also be carried out separately, using the same cartridge 100, it preferably being possible to control the analysis device 200 using the different pieces of control information 510 in order to carry out the different tests on the sample P.

Alternatively, or additionally, one or more of the different pieces of control information 510 can be selected, it preferably being possible to carry out one or more tests supported by the cartridge 100, in particular a nucleic-acid assay and/or a protein assay, using the selected piece or pieces of control information 510.

The different pieces of evaluation information 530 may be designed for differently evaluating measurement results 713 from the test, the different pieces of evaluation information 530 preferably being designed for differently evaluating measurement results 713 determined in the same test and/or for evaluating different tests on the sample P, which can preferably also be carried out separately, using the same cartridge 100.

In the following, a particular example is described of a preferred work flow. Although the preferred work flow, of course, is particularly advantageous, different aspects of the following example can be realized independently and form distinct inventive concepts and can be combined in different configurations leading two further advantages.

In this example, the operating instrument 400 is realized as a mobile device like a smartphone or tablet. The operating instrument 400 has an input apparatus 420 in form of a touch sensitive display. The operating instrument 400 is separated from and remote of the analysis device 200 and from the cartridge 100 and the database 500.

A specific cartridge 100 is provided and at least one and preferably multiple pieces of control information 510 stored in said database 500 corresponding to said specific cartridge 100.

First, said specific cartridge 100 is identified by means of said operating instrument 400. This particularly preferably is conducted by input or reading a cartridge identifier 100C with the operating instrument 400, the cartridge identifier 100C identifying unambiguously the cartridge or a charge or batch of cartridges said specific cartridge 100 belongs to. The cartridge identifier 100C can be or comprise a piece of code like a sequence of numbers, bits or the like.

Preferably, the cartridge identifier 100C is scanned, in particular with the camera 421 of the input apparatus 420. However, the cartridge identifier 100C can alternatively or additionally be input via the input apparatus 420, in particular via touchpad 422.

Optionally, the operating instrument 400 identifies the analysis device 200 to be used for the test and/or which has a data connection with said operating instrument 400.

Using the cartridge identifier 100C and, optionally, an identifier identifying the analysis device 200, a particular piece of control information 410 is received or retrieved from the database 500. However, receiving or retrieving said piece of control information 510 can also be realized without identifiers.

Preferably, different pieces of control information 510 corresponding to different tests (test sequences) are stored in the data base 500 and can be received or retrieved from the data base 500 by the operating instrument 400. For receiving or retrieving one of said pieces of control information 510, a data connection DVD is provided or established between the operating instrument 400 and the data base 500 which transmits the one of said pieces of control information 510 which is configured for controlling the test or test sequence of the sample P within said specific cartridge 100 using the analysis device 200 to the operating instrument 400.

If the data base 500 stores multiple pieces of control information 510 which are each configured to controlling the test or test sequence with the specific cartridge 100, the analysis system 1 preferably is configured to enable or enables selection of a particular one of the said pieces of control information 510 such that merely the test or the test sequence defined by the selected one of the pieces of control information 510 is used to carry out the test or test sequence. In the present example, the operating instrument 400 supports selecting a particular one of said pieces of control information 510 using the touchpad 422, for example by clicking, dragging and/or dropping an icon representing said particular piece of control information 510.

For this purpose, the data base 500 can send the piece of option information 561 identifying different pieces of control information 510 being compatible with a particular cartridge 100 to the operating instrument 400. The operating instrument 400 then displays those pieces of option information 561, and enables selection. Alternatively, the data base 500 can forward the different pieces of control information 510 and the operating instrument 400 displays information like icons representing those different pieces of control information 510.

Anyway, one particular piece of control information 510 and/or test or a test sequence defined by said piece of control information 510 is selected by means of the operating instrument 400. This selected piece of control information 510 is retrieved from the data base 500 and/or selected within the operating instrument 400 to be forwarded or provided to the analysis device 200.

The piece of control information 510 which the operating instrument 400 received or selected is forwarded or provided to the analysis device 200. The analysis device 200 is programmed by the piece of control information 510 to carry out a specific test or test sequence using the specific cartridge 100.

Preferably an additional start command input into the operating instrument 400 and transmitted to the analysis device 200 starts the test or test sequence. This start, of course, is under the precondition that the specific cartridge 100 is input into the analysis device 200 and, preferably, the analysis device 200 and/or the operations instrument has verified that the piece of control information 510 is compatible with the cartridge 100 to carry out the test or test sequence.

The analysis device 200 then preferably full automatically acts on the cartridge 100 such that the test or test sequence, in particular assay, is carried out as defined by the selected piece of control information 520.

Afterwards, the analysis device 200 transmits a measurement result 713 measured by the test or test sequence to the operating instrument 400.

A specific piece of evaluation information 530 can be received or retrieved from the same or a different data base 500 as previously described in connection with the piece of control information 510. This can take place together with selection, receiving and/or retrieval of said piece of control information 510 or separately, in particular afterwards.

Further, there might be multiple pieces of evaluation information 530 which can be selected as described in connection with selection of the piece of control information 510, but preferably is not transmitted to the analysis device 200. Instead, the selected piece of evaluation information 530 is directly used by the operating instrument 400. Here, a processor of the operating instrument 400 is used to calculate the outcome from the received measurement result 713 using the piece of evaluation information 530 which can be or comprise instructions and/or an algorism for calculating the outcome from the measurement result 713.

The operating instrument 400 computes, using the specific piece of evaluation information 530, an outcome based on said measurement result 713. Afterwards, an outcome of this evaluation is output by the operating instrument 400, in particular displayed, and/or transmitted to the data base 500 or to a different receiver.

In general, the analysis device 200, the cartridge 100 or in particular the sensor apparatus 113 may measure, detect or identify the one or more analytes A by means of specific bonding, in particular by means of capture molecules and/or of means of electrochemical detection such as redox cycling, or the like, preferably performed on the cartridge 100 and/or in the sensor apparatus 113. Preferably, the capture molecules are arranged or immobilized on a sensor array or on sensor fields or electrodes of the sensor apparatus 113. In particular, an immuno-assay or a protein assay for detecting or identifying a protein and/or a nucleic-assay for detecting or identifying a nucleic-acid sequence can be or is realized.

Alternatively, or additionally, measurements without specific bonding and/or without electrochemical detection can be used or performed, preferably in or by the analysis device 200 and/or cartridge 100. Such measurements can include an optical measurement, impedance measurement, capacitance measurement, spectrometric measurement, mass spectrometric measurement, or the like. For this purpose, the analysis device 200 or cartridge 100 may comprise an optical spectrometer and/or allow optical measurements of the treated or untreated sample P. Thus, it is possible to measure, detect or identify other or further analytes A, compounds, material characteristics, or the like of the sample P, e.g., within the cartridge 100 or any other sample carrier. These alternative or additional measurements can be used or processed and/or evaluated in a similar manner as described or differently.

Preferably, the analysis system 1 or parts thereof control the testing of the sample (P) and/or is/are used to evaluate the testing. Particularly preferably, the analysis system 1 or the analysis device 200 carries out or controls the testing automatically, in particular based on or as defined by a/the piece of control information 510. Alternatively, or additionally, the analysis system 1 or the operating instrument 400 carries out or controls the evaluation automatically, preferably based on or as defined by a/the piece of evaluation information 530.

In particular, the present invention relates also to any one of the following aspects which can be realized independently or in any combination, also in combination with any aspects described above or in the claims.

1. Method for testing, in particular, a biological sample P by means of an analysis system 1,
the analysis system 1 comprising a cartridge 100 for receiving the sample P, the cartridge 100 comprising, for a test supported by the cartridge 100, a sensor apparatus 113 and a fluid system 103 for conveying the sample P to the sensor apparatus 113, the analysis system 1 comprising an analysis device 200 for receiving the cartridge (100) and subsequently carrying out the test using the received cartridge 100, characterized
   in that the cartridge 100 supports different tests on the sample P, which can also be carried out separately, and for which the sample P is conveyed and/or treated in different manners specific to the respective tests, in that at least two different pieces of control information 510 are provided that correspond to the different tests, and in that at least one piece or certain pieces of the control information 510 is/are selected for carrying out the test using the cartridge 100, and/or
   in that measurement results 713 are determined by the sensor apparatus 113 of the cartridge 100 by means of the test, in that at least two different pieces of evaluation information 530 are provided for carrying out different evaluations of the measurement results 713, and in that at least one piece or certain pieces of the evaluation information 530 is/are selected and/or used for evaluating the measurement results 713 determined by the test on the sample P.

2. Method according to aspect 1, characterized in that the analysis device 200 is controlled using the selected piece of control information 510, such that the sample P is conveyed and/or treated within the cartridge 100 in the manner that is specific to the test corresponding to the selected piece of control information 510, and/or in that one or more tests supported by the cartridge 100, in particular a nucleic-acid assay and/or a protein assay, are controlled using the selected piece of control information 510, and/or in that the analysis device 200 is controlled using the different pieces of control information 510 in order to carry out different tests on the sample P, which can also be carried out separately.

3. Method according to aspect 1 or 2, characterized in that measurement results 713 from the same test on the sample P carried out using the cartridge 100 are evaluated using the different pieces of evaluation information 530, and/or in that measurement results 713 from different tests on the sample P carried out using the same cartridge 100 are evaluated using the different pieces of evaluation information 530.

4. Method according to any one of the preceding aspects, characterized in that the different pieces of control information 510 are stored, preferably in a database 400, for the same cartridge 100, only certain pieces of control information 510 being enabled for retrieval and/or the control using only the certain pieces of control information 510 being enabled, preferably provided that the certain pieces of control information 510 correspond to the cartridge 100 and/or are compatible with the cartridge 100 and/or are enabled for the cartridge 100, and/or other pieces of control information 510 being prevented from being retrieved and/or the control using the other pieces of control information 510 being prevented, preferably provided that the other pieces of control information 510 do not correspond to the cartridge 100 and/or are not compatible with the cartridge 100 and/or are not enabled for the cartridge 100.

5. Method according to any one of the preceding aspects, characterized in that different pieces of evaluation information 530 are stored, preferably in a database 400, for the same cartridge 100, only certain pieces of evaluation information 530 being enabled for retrieval and/or the evaluation of the measurement results 713, from the test that can be carried out using the cartridge 100, using only the certain pieces of evaluation information 530 being enabled, the certain pieces of evaluation information 530 preferably corresponding to the cartridge 100 and/or being suitable for evaluating measurement results 713 that can be determined by the test using the cartridge 100 and/or being enabled for the cartridge 100, and/or other pieces of evaluation information 530 being prevented from being retrieved or the evaluation using the other pieces of evaluation information 530 being prevented, the other pieces of evaluation information 530 preferably not corresponding to the cartridge 100 and/or not being compatible with the cartridge 100 and/or not being enabled for the cartridge 100.

6. Method according to any one of the preceding aspects, characterized in that a cartridge identifier 100C of the cartridge 100 is determined and, depending on the cartridge identifier 100C, pieces of control information 510 for the test are enabled for or blocked from being retrieved or used, and/or pieces of evaluation information 530 for use in the evaluation of measurement results 713 from the test are enabled for or blocked from being retrieved or used.

7. Method according to any one of the preceding aspects, characterized in that the analysis system 1 comprises an operating instrument 400 which can preferably be separated from the analysis device 200 in with respect to a data connection and/or which can preferably be wirelessly connected to the analysis device 200, the pieces of control information 510 being retrieved using the operating instrument 400 and/or being transmitted to the analysis device (200) by the operating instrument 400 in order to control the test, and/or the pieces of evaluation information 530 being retrieved using the operating instrument 400, and/or measurement results 713 determined during the test being transmitted to the operating instrument 400 and/or being analysed by the operating instrument 400, in particular in different manners and/or in order to determine different characteristic values or to detect diseases.

8. Method according to any one of the preceding aspects, characterized in that first pieces of the different pieces of control information 510 correspond to a protein assay and second pieces of the different pieces of control information 510 correspond to a nucleic-acid assay, the analysis device 200 preferably being controlled using the pieces of control information 510 such that both the protein assay and the molecular assay can be or are carried out by means of the different pieces of control information 510 using the same analysis device 200 and/or the same cartridge 100.

9. Method according to any one of the preceding aspects, characterized in that first pieces of the different pieces of evaluation information 530 correspond to a protein assay and second pieces of the different pieces of evaluation information 530 correspond to a nucleic-acid assay, the measurement results 713 from the test preferably being evaluated using the pieces of evaluation information 530 such that measurement results 713 from both the protein assay and the nucleic-acid assay can be analyzed by the different pieces of evaluation information 530, in particular such that the presence of certain amino-acid sequences, proteins and/or diseases is/are determined and/or output.

10. Computer program product comprising program code means which, when executed, cause the steps of the method according to any one of the preceding claims to be carried out.

11. Analysis system 1 for testing, in particular, a biological sample P, the analysis system 1 preferably being designed to carry out the steps of the method according to any one of aspects 1 to 10, the analysis system 1 comprising a cartridge 100 for receiving the sample P, the cartridge 100) comprising, for a test supported by the cartridge 100, a sensor apparatus 113 and a fluid system comprising channels for conveying the sample P to the sensor apparatus 113, and the analysis system 1 comprising an analysis device 200 for receiving the cartridge 100 and subsequently carrying out the test using the received cartridge 100, characterized in that the cartridge 100 supports different tests on the sample P, which can also be carried out separately, and for which the sample P is conveyed and/or treated within the cartridge 100 in different manners specific to the respective tests, in that at least two pieces of control information 510 are provided that correspond to the different tests, in that at least one piece or certain pieces of the control information 510 can be selected for carrying out the test using the cartridge 100, and in that the analysis device 200 can be controlled using the selected piece of control information 510 such that the sample P is conveyed and/or treated within the cartridge 100 in the manner specific to the test corresponding to the selected piece of control information 510, and/or in that measurement results 713 can be determined using the sensor apparatus 113 of the cartridge 100 by means of the test, in that at least two different pieces of evaluation information 530 are provided for carrying out different evaluations of the measurement results 713, and in that at least one piece or certain pieces of the evaluation information 530 can be selected for evaluating the measurement results 713 determined by the test on the sample P, and in that the measurement results 713 can be evaluated in different manners, in the manners specified by the pieces of evaluation information 530.

12. Analysis system according to aspect 11, characterized in that the different pieces of control information 510 are designed to control different tests on the sample P, which can preferably also be carried out separately, using the same cartridge 100, it preferably being possible to control the analysis device 200 using the different pieces of control information 510 in order to carry out the different tests on the sample P, and/or in that one or more of the different pieces of control information 510 can be selected, it preferably being possible to carry out one or more tests supported by the cartridge 100, in particular a nucleic-acid assay and/or a protein assay, using the selected piece or pieces of control information 510.

13. Analysis system according to aspect 11 or 12, characterized in that the different pieces of evaluation information 530 are designed for differently evaluating measurement results 713 from the test, the different pieces of evaluation information 530 preferably being designed for differently evaluating measurement results 713 determined in the same test and/or for evaluating different tests on the sample P, which can preferably also be carried out separately, using the same cartridge 100.

14. Analysis system according to any one of aspects 11 to 13, characterized in that different pieces of control information 510 and/or evaluation information 530 are stored for the same cartridge 100, the analysis system 200 being designed
a) to only enable certain pieces of control information 510 and/or certain pieces of evaluation information 530 for retrieval and/or to enable the control using said certain pieces of control information 510 and/or to enable the evaluation using said certain pieces of evaluation information 530, preferably provided that the certain pieces of control information 510 and/or evaluation information 530 correspond to the cartridge 100 and/or are compatible with the cartridge 100 and/or are enabled for the cartridge 100, and/or
b) to prevent other pieces of control information 510 and/or other pieces of evaluation information 530 from being retrieved, or to prevent the control using the other pieces of control information 510 and/or to prevent the evaluation using the other pieces of evaluation information 530, the other pieces of control information 510 and/or evaluation information 530 preferably not corresponding to the cartridge 100 and/or not being compatible with the cartridge 100 and/or not being enabled for the cartridge 100.

15. Analysis system according to any one of aspects 11 to 14, characterized in that the analysis system 1 comprises an operating instrument 400 which can preferably be separated from the analysis device 200 with respect to a data connection and/or which can preferably be wirelessly connected to the analysis device 200 and which is designed to retrieve pieces of control information 510 and to transmit said pieces of information to the analysis device 200 in order to control the test and/or to evaluate the measurement results 713 determined by the test in different manners using the different pieces of evaluation information 530, in particular in order to detect different characteristic values or diseases, it preferably being possible to determine a cartridge identifier 100C of the cartridge 100 using the operating instrument 400 and, depending on the cartridge identifier 100C, it being possible for pieces of control information 510 for the test and/or
pieces of evaluation information 530 for use in the evaluation of measurement results 713 from the test
to be enabled for or blocked from being retrieved and/or used.

Individual aspects and features of the present invention and individual method steps and/or method variants may be implemented independently from one another, but also in any desired combination and/or order.

16. Analysis system for testing, in particular, a biological sample,
the analysis system comprising a cartridge for receiving the sample,
the analysis system comprising an analysis device for receiving the cartridge and subsequently carrying out the test using the received cartridge,
the cartridge supporting different tests on the sample, which can also be carried out separately, and for which the sample is conveyed and/or treated within the cartridge in different manners specific to the respective tests,
wherein at least two pieces of control information are provided that correspond to said different tests,
wherein at least one piece or certain pieces of said control information is/are selectable for carrying out the test, and
in that the analysis device is configured to be controlled using the selected piece of control information, preferably such that the sample is conveyed and/or treated within the cartridge in the manner specific to the test corresponding to the selected piece of control information, and in that said different pieces of control information are stored in a database,
wherein only certain of said pieces of control information are unblocked for the cartridge, the analysis system being configured to only enable unblocked pieces of control information for selection, for retrieval and/or to enable the control using said certain pieces of control information; and/or
wherein, in particular other, one or ones of said pieces of control information are blocked for the cartridge, the analysis system being configured to prevent blocked pieces of control information for one or more of: to be selected, to be retrieved, and to enable the control using said blocked pieces of control information.

17. Analysis system according to aspect 16, wherein the different pieces of control information are configured to control different tests on the sample using the same cartridge.

18. Analysis system according to aspect 16, wherein the analysis device is configured for control using the different pieces of control information in order to carry out the different tests on the sample.

19. Analysis system according to aspect 18, wherein the analysis device or analysis system is configured to carry out one or more tests supported by the cartridge using the selected piece or pieces of control information.

20. Analysis system according to aspect 19, wherein the analysis system or the analysis device is configured to carry out a nucleic-acid assay and/or a protein assay using the selected piece or pieces of control information.

21. Analysis system according to aspect 16, wherein the certain or unblocked pieces of control information correspond to the cartridge and/or are compatible with the cartridge.

22. Analysis system according to aspect 16, wherein the analysis system is configured to prevent other or blocked pieces of control information from being selected, being retrieved, or to prevent the control using the other or blocked pieces of control information.

23. Analysis system according to aspect 22, wherein the other pieces of control information are blocked that do not correspond to the cartridge and/or are not compatible with the cartridge and/or are disabled for the cartridge.

24. Analysis system according to aspect 16, wherein the analysis system comprises an operating instrument which is configured to retrieve said selected pieces of control information and to transmit said selected pieces of control information to the analysis device in order to control the test.

25. Analysis system according to aspect 24, wherein the operating instrument is configured to retrieve pieces of control information and to transmit said pieces of control information to the analysis device and/or in order to detect different characteristic values or diseases.

26. Analysis system according to aspect 24, wherein the operating instrument is configured to determine a cartridge identifier of the cartridge and, depending on the cartridge identifier, pieces of control information for the test can be unblocked for or blocked from being selected, retrieved and/or used.

27. Analysis system according to aspect 24, wherein the operating instrument can be separated from the analysis device physically and/or with respect to a data connection and/or can be wirelessly connected to the analysis device.

28. Analysis system for testing, in particular, a biological sample,
the analysis system comprising a cartridge for receiving the sample,
the analysis system comprising an analysis device for receiving the cartridge and subsequently carrying out the test using the received cartridge,
the analysis device being configured to determine measurement results by means of the test, wherein at least two different pieces of evaluation information are provided for carrying out different evaluations of the measurement results, and at least one piece or certain pieces of said evaluation information is/are selectable for evaluating the measurement results, and/or the measurement results are evaluable specified by the selected piece or pieces of evaluation information.

29. Analysis system according to aspect 28, wherein said different pieces of evaluation information are stored in a database,
wherein only certain of said different pieces of control information are unblocked for the cartridge, thus being enabled for selection, being enabled for retrieval and/or the evaluation using only the certain of said pieces of evaluation information being enabled; and/or
wherein, in particular other, are or ones of said different pieces of control information are blocked for the cartridge, thus being prevented from being selected, being prevented from being retrieved and/or the evaluation using said, in particular other, pieces of evaluation information being prevented.

30. Analysis system according to aspect 28, wherein said different pieces of evaluation information are configured for differently evaluating measurement results from the same test or for evaluating different tests on the sample obtainable using the same cartridge.

31. Analysis system according to aspect 28, wherein the different pieces of evaluation information are configured for evaluating measurement results of different tests on the sample which can also be carried out separately.

32. Analysis system according to aspect 28, wherein the certain or unblocked pieces of evaluation information correspond to the cartridge and/or are compatible with the cartridge, wherein the analysis system is configured to prevent other or blocked pieces of evaluation information from being selected and/or retrieved, and/or to prevent the evaluation using the other pieces of evaluation information, wherein the other or blocked pieces of evaluation information do not correspond to the cartridge and/or are not compatible with the cartridge and/or are disabled for the cartridge.

33. Analysis system according to aspect 28, wherein the analysis system comprises an operating instrument which is configured to evaluate the measurement results determined by the test in different manners using the different pieces of evaluation information.

34. Analysis system according to aspect 33, wherein the operating instrument is designed to evaluate the measurement results in order to detect different analytes characteristic values or diseases.

35. Analysis system according to aspect 34, wherein the operating instrument is configured to determine a cartridge identifier of the cartridge and, depending on the cartridge identifier, pieces of evaluation information for use in the evaluation of measurement results from the test are unblockable or blockable from being selected, retrieved and/or used.

What is claimed is:

1. Method for testing a sample by means of an analysis system comprising a cartridge for receiving the sample, an analysis device for receiving the cartridge and subsequently carrying out the test using the received cartridge
    the cartridge being configured to separately carry out different tests on the sample, for which the sample is treated in different manners at least in part along paths of the cartridge specific to the respective tests by different treatment processes that are performed before the sample is fed to a sensor apparatus for measuring, the treatment processes being independently selectable, the method comprising:
    providing at least two different pieces of control information in a database that correspond to the different tests,
    unblocking only certain of said pieces of control information for the cartridge, thus the certain pieces of control information being enabled for at least one of selection, retrieval or control using only the enabled certain of said pieces of control information;
    selecting or using at least one unblocked piece or certain unblocked pieces of said control information for respectively carrying out at least one of the different tests on the sample using at least a selected one of the different treatment process in the cartridge based on said at least one of the unblocked pieces of control information for carrying out of the at least one of the different tests on the sample, and
    receiving said cartridge that is configured to separately carry out different tests independently on the sample in different manners in the analysis device and using said cartridge to carry out said at least one of the different tests on the sample,
    wherein a cartridge identifier of the cartridge is determined and, depending on the cartridge identifier, pieces of control information for the test are blocked or unblocked.

2. The method according to claim 1, wherein the method further comprising controlling the analysis device using the selected control information, such that the sample is conveyed and/or treated within the cartridge in a manner that is specific to the test corresponding to the control information being selected, retrieved or used.

3. The method according to claim 1, wherein one or more tests supported by the cartridge are controlled using selected control information.

4. The method according to claim 3, wherein a nucleic-acid assay and/or a protein assay are controlled using the selected control information.

5. The method according to claim 1, wherein the analysis device is controlled using the different pieces of control information in order to carry out different tests on the same sample, which can also be carried out separately.

6. The method according to claim 1, wherein the certain pieces of control information are based on the cartridge being used.

7. The method according to claim 1, wherein pieces of control information are blocked and/or are disabled based on the cartridge being used.

8. The method according to claim 1, wherein the selected and/or unblocked piece or pieces of control information is retrieved by an operating instrument or transmitted to the analysis device using the operating instrument in order to control the test.

9. The method according to claim 1, wherein a first piece of the different pieces of control information is configured to control a protein assay and a second piece of the different pieces of control information is configured to control a nucleic-acid assay.

10. The method according to claim 1, comprising the further steps of:
   determining measurement results by means of said test,
   providing at least two different pieces of evaluation information for carrying out different evaluations of said measurement results, and
   selecting or using at least one piece of said pieces of evaluation information for evaluating the measurement results determined by the test on the sample.

11. Method for testing a sample by means of an analysis system comprising a cartridge for receiving the sample, an analysis device for receiving the cartridge and subsequently carrying out the test using the received cartridge
   the cartridge being configured to separately carry out different tests on the sample, for which the sample is treated in different manners at least in part along paths of the cartridge specific to the respective tests by different treatment processes that are performed before the sample is fed to a sensor apparatus for measuring, the treatment processes being independently selectable, the method comprising:
   providing at least two different pieces of control information in a database that correspond to the different tests,
   unblocking only certain of said pieces of control information for the cartridge, thus the certain pieces of control information being enabled for at least one of selection, retrieval or control using only the enabled certain of said pieces of control information;
   selecting or using at least one unblocked piece or certain unblocked pieces of said control information for respectively carrying out at least one of the different tests on the sample using at least a selected one of the different treatment process in the cartridge based on said at least one of the unblocked pieces of control information for carrying out of the at least one of the different tests on the sample, and
   receiving said cartridge that is configured to separately carry out different tests independently on the sample in different manners in the analysis device and using said cartridge to carry out said at least one of the different tests on the sample,
   wherein a first piece of the different pieces of control information is configured to control a protein assay and a second piece of the different pieces of control information is configured to control a nucleic-acid assay, and
   wherein only one of said first and second pieces of control information is unblocked while the other one of said first and second pieces of control information is or remains blocked.

12. The method according to claim 9, wherein the analysis device is controlled using one of said first and second pieces of control information such that only one of or both the protein assay and the nucleic-acid assay can be or are carried out by means of said first and/or second different pieces of control information using at least one of the same analysis device and the same cartridge.

13. An analysis system for testing a sample, comprising:
   at least one cartridge for receiving a single sample and configured for independently performing each of a plurality of different tests on the sample along respective paths of the cartridge before the sample is fed to a sensor apparatus for measuring, the treatment processes being independently selectable, the at least one cartridge having an identifier for identifying the particular cartridge,
   means for reading out said identifier for use in retrieving control information for performing a particular test or tests on the sample,
   a data base containing at least two different pieces of control information that correspond to said different tests that are independently performable with the at least one cartridge, the pieces of control information being selectable based on the identifier read out by said means for reading, and
   an analysis device for receiving the at least one cartridge and subsequently carrying out the different tests on the single sample using a received cartridge, and
   an operating instrument for respectively controlling performing of each of the different tests using said control information for respectively carrying out the different tests on the sample using selected treatment processes on the cartridge based on the control information for carrying out of the different tests on the sample, and
   means for unblocking only certain of said pieces of control information in said data base for enabling selection or retrieval thereof for control as to which of the different tests is performable with the received cartridge using only the unblocked pieces of control information,
   wherein said means for unblocking is operative for determining said cartridge identifier of the particular cartridge and, depending on the cartridge identifier, pieces of control information for the test are blocked or unblocked.

* * * * *